(12) United States Patent
Sakakibara

(10) Patent No.: US 8,514,435 B2
(45) Date of Patent: Aug. 20, 2013

(54) COMMUNICATION SYSTEM HAVING A PLURALITY OF COMMUNICATION MODES

(75) Inventor: Shinichi Sakakibara, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 724 days.

(21) Appl. No.: 12/725,911

(22) Filed: Mar. 17, 2010

(65) Prior Publication Data

US 2010/0245903 A1 Sep. 30, 2010

(30) Foreign Application Priority Data

Mar. 31, 2009 (JP) ................................. 2009-084371

(51) Int. Cl.
 *G06F 3/12* (2006.01)
(52) U.S. Cl.
 USPC ........................................ 358/1.15; 358/1.13
(58) Field of Classification Search
 USPC ............... 358/1.1, 1.13, 1.15, 400, 407, 434, 358/435, 436, 438, 439, 442, 468
 See application file for complete search history.

(56) References Cited

U.S. PATENT DOCUMENTS

| 2004/0036925 | A1* | 2/2004 | Imaizumi ...................... 358/405 |
| 2006/0274368 | A1 | 12/2006 | Imine |
| 2007/0081486 | A1 | 4/2007 | Koide |
| 2009/0036056 | A1 | 2/2009 | Oshima et al. |

FOREIGN PATENT DOCUMENTS

| JP | H06-037912 A | 2/1994 |
| JP | 2003-283729 A | 10/2003 |
| JP | 2003-338892 A | 11/2003 |
| JP | 2004-221833 A | 8/2004 |
| JP | 2005-150963 A | 6/2005 |
| JP | 2005-197919 A | 7/2005 |
| JP | 2005-252612 A | 9/2005 |
| JP | 2006-345102 A | 12/2006 |
| JP | 2007-089040 A | 4/2007 |
| JP | 2007-089041 A | 4/2007 |
| JP | 2007-110343 A | 4/2007 |
| JP | 2007-288722 A | 11/2007 |
| JP | 2008-283590 A | 11/2008 |
| JP | 2009-037566 A | 2/2009 |
| JP | 2009-054066 A | 3/2009 |
| JP | 2009-055572 A | 3/2009 |

OTHER PUBLICATIONS

Japan Patent Office, Notification of Reason for Refusal for Japanese Patent Application No. 2009-084371 (counterpart to above-captioned patent application), dispatched Feb. 22, 2011.

\* cited by examiner

*Primary Examiner* — Thomas D Lee
(74) *Attorney, Agent, or Firm* — Baker Botts L.L.P.

(57) ABSTRACT

A communication system including a communication box connected to a public communication line and capable of data communication with a child unit through a digital cordless (DCL) wave and with a multi-function device through a wires LAN (WLAN) wave, and wherein each of the child unit and multi-function device has a light emitting portion and a light receiving portion for optical communication between the child unit and multi-function device. The communication box and multi-function device have respective WLAN communication control portions which are normally placed in a non-operating state, and when the communication box receives facsimile data from the public communication line, the communication box commands the child unit to require the multi-function device to start its WLAN communication control portion, starts its own WLAN communication control portion, and transmit the facsimile data to the multi-function device through the WLAN wave.

14 Claims, 8 Drawing Sheets

FIG.4 <BASIC FACSIMILE RECEPTION OPERATIONS>

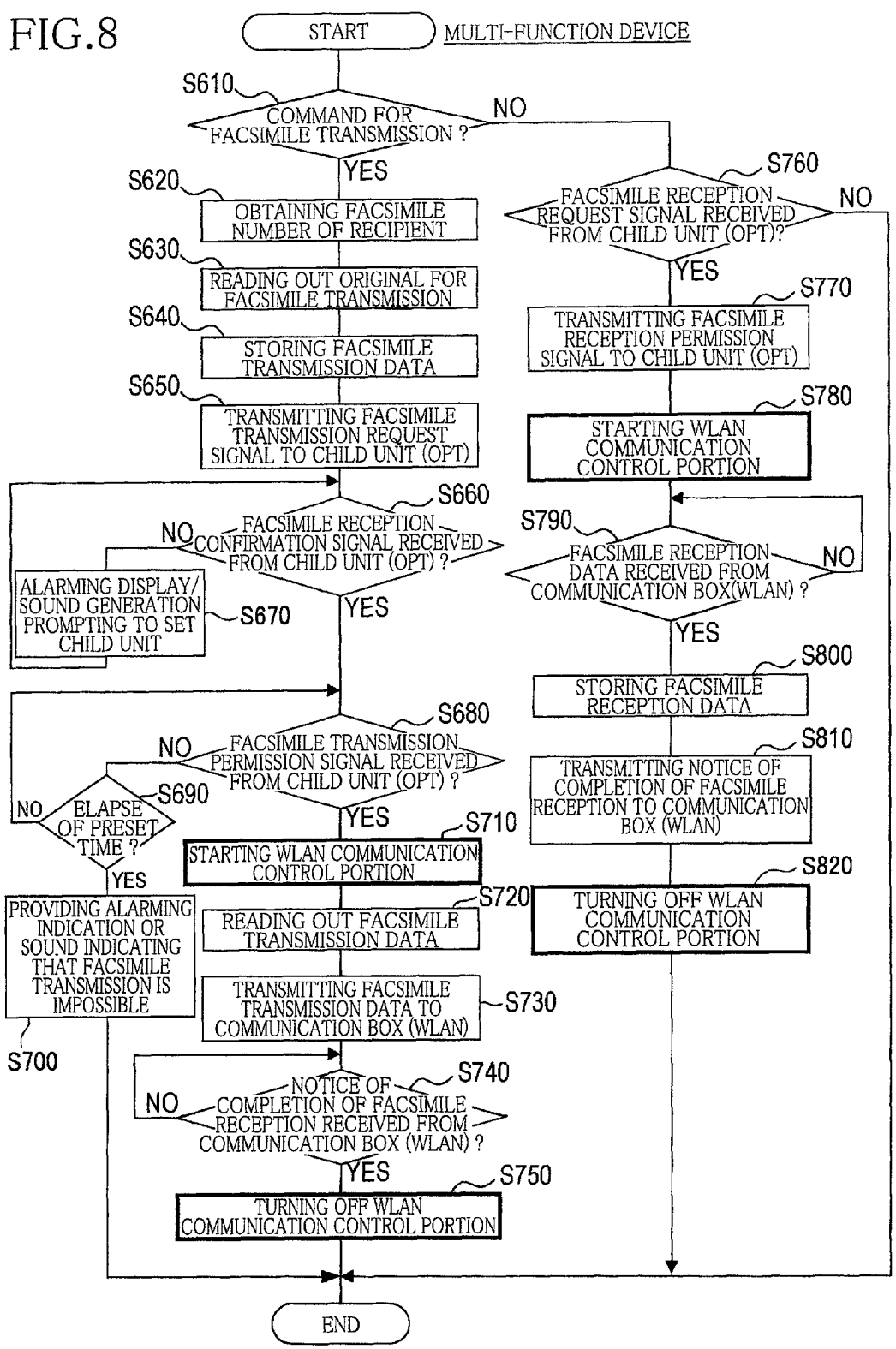

COMMUNICATION SYSTEM HAVING A PLURALITY OF COMMUNICATION MODES

CROSS REFERENCE TO RELATED APPLICATION

The present application claims the priority from Japanese Patent Application No. 2009-084371 filed Mar. 31, 2009, the disclosure of which is herein incorporated by reference in its entirety.

BACKGROUND OF THE INVENTION

1. Field of the Invention

The present invention relates to a communication system including two different types of communication devices having a wireless or radio communication function for radio communication with each other, and to those communication, devices of the communication system, and peripheral devices used in the communication system.

2. Description of Related Art

There is known a digital cordless telephone communication system having a facsimile function, which system generally includes a communication line connecting portion, a recording portion and a reading portion, which are integrally built in one housing body. The communication line connecting portion is connected to an external public communication line and is configured to transmit and receive communication sound signals and facsimile data, and the recording portion is configured to print or record, on a recording medium such as a sheet of paper, facsimile reception data (image data) received through the public communication line, while the reading portion is configured to read images on an original for facsimile transmission.

Recently, it has been proposed to separate a communication system into a device connected to the public communication line and a device having the recording and reading portion. Namely, there has been proposed a communication system including two separate devices consisting of a communication box having the communication line connecting portion, and an image processing device having the recording portion and reading portion.

In the communication system including the two separate devices described above, the facsimile reception data received by the communication box from the public communication line are transmitted to the image processing device through a network (e.g., wireless LAN), and the image processing device performs a recording operation on the recording medium according to the facsimile reception data received through the network. On the other hand, the facsimile transmission data representative of the images of the original read by the image processing device are transmitted to the communication box through the network, and the communication box performs an operation to transmit the facsimile transmission data to the public communication line.

Where the digital cordless telephone communication system having the facsimile function includes the separate communication box and image processing device as described above, the communication box requires a wireless LAN communication control portion for transmission and reception of facsimile data to and from the image processing device, in addition to a digital cordless communication control portion for transmission and reception of communication sound data between the communication line connecting portion and a child unit, but does not include the recording portion and reading portion, so that the communication box can be small-sized.

Accordingly, the user of the digital cordless telephone communication system can install the communication box in a relatively narrow space, and install the image processing device at a desired location remote from the communication box, leading to an increased degree of freedom of installation of the communication box and image processing device.

SUMMARY OF THE INVENTION

The present invention was made in view of the background art described above. It is therefore an object of the present invention to sufficiently reduce electric energy consumption required for wireless communication between two different types of communication devices in a wireless communication system.

The object indicated above can be achieved according to a first aspect of this invention, which provides a communication system comprising: a primary communication device having a first communicating portion configured to effect wireless communication in a first communication mode, and a second communicating portion configured to effect wireless communication in a second communication mode different from the first communication mode; a first auxiliary communication device having a first auxiliary communicating portion configured to effect communication with the first communicating portion of the primary communication device in the first communication mode; and a second auxiliary communication device having a second auxiliary communicating portion configured to effect communication with the second communicating portion of the primary communication device in the second communication mode, wherein the first auxiliary communication device further has a third auxiliary communicating portion configured to effect the communication with the second auxiliary communication device in a third communication mode different from the first communication mode and the second communication mode, the second auxiliary communication device further having a fourth auxiliary communicating portion configured to effect the communication with the third auxiliary communicating portion in the third communication mode.

At least one of the primary communication device and the second auxiliary communication device further has a first control portion configured such that when the above-indicated one communication device is commanded to effect the communication with the other communication device in the second communication mode, the first control portion transmits to the other communication device a request to start the communicating portion of the other communication device, in the first communication mode and the third communication mode, starts the communicating portion of the above-indicated one communication device to effect the communication in the second communication mode, and stops an operation of the communicating portion of the above-indicated one communication device in the second communication mode after the communication with the other communication device in the second communication mode is terminated.

The other communication device further has a second control portion configured such that when the other communication device receives the request to start its communicating portion from the above-indicated one communication device, in the first and third communication modes, the second control portion starts the communicating portion of the other communication device to effect the communication in the second communication mode, and stops an operation of the communicating portion of the above-indicated other communication device in the second communication mode after the communication with the above-indicated one communication device in the second communication mode is terminated.

The object indicated above can also be achieved according to a second aspect of the present invention, which provides a communication device comprising a first communicating portion configured to effect communication with a first auxiliary communication device in a first communication mode, and a second communicating portion configured to effect communication with a second auxiliary communication device in a second communication mode different from the first communication mode, the first auxiliary communicating device being configured to transmit to the second auxiliary communication device a signal based on predetermined data received from the communicating device.

The communication device further comprises: a start requesting portion configured to command the first communicating portion to transmit, as the predetermined data, a start signal to enable the second auxiliary communication device to effect the communication in the second communication mode when the communication device is commanded to effect the communication with the second auxiliary communication device; a first starting portion configured to start the second communicating portion when the communication device is commanded to effect the communication with the second auxiliary communication device; and a first stopping portion configured to stop an operation of the second communicating portion when the communication of the second communicating portion with the second auxiliary communication device is terminated after the second communicating portion is started by the first starting portion.

The object indicated above can also be achieved according to a third aspect of this invention, which provides a communication device comprising a communicating portion configured to effect wireless communication with a primary communication device in a first communication mode, and a signal transmitting/receiving portion configured to transmit and receive a signal to and from an auxiliary communication device, the primary communication device and the auxiliary communication device being capable of effecting mutual communication with each other in a second communication mode different from the first communication mode.

The communication device comprising at least one of a start request signal commanding portion configured to command the signal transmitting/receiving portion to transmit a signal indicative of a first start request to enable the auxiliary communication device to effect the communication in the second communication mode when the communicating portion has received the first start request from the primary communication device; and a start request data commanding portion configured to command the communicating portion to transmit data indicative of a second start request to start the primary communication device for enabling the primary communication device to effect the communication with the auxiliary communication device in the second communication mode when the signal transmitting/receiving portion has received the second start request from the auxiliary communication device.

The object indicated above can also be achieved according to a fourth aspect of the present invention, which provides a communication device configured to effect communication with a primary communication device, and an auxiliary communication device configured to effect wireless communication with the primary communication device in a first communication mode, the auxiliary communication device configured to transmit to the primary communication device data based on a predetermined signal received from the communication device.

The communication device comprises: a communicating portion configured to effect wireless communication with the primary communication device in a second communication mode different from the first communication mode; a signal transmitting/receiving portion configured to transmit a signal to and from the auxiliary communication device; a start request commanding portion configured to command the signal transmitting/receiving portion to transmit, as the predetermined signal, a start request to enable the primary communication device to effect the wireless communication with the communicating portion in the second communication mode when the communication device is commanded to effect the communication with the primary communication device; a first starting portion configured to start the communicating portion when the communication device is commanded to effect the communication with the primary communication device in the second communication mode; and a first stopping portion configured to stop an operation of the communicating portion when the data communication of the communicating portion with the primary communication device is terminated after the communicating portion is started by the first starting portion.

BRIEF DESCRIPTION OF THE DRAWINGS

The above and other objects, features, advantages and technical and industrial significance of the present invention will be better understood by reading the following detailed description of a preferred embodiment of the present invention, when considered in connection with the accompanying drawings, in which:

FIG. 8 is a flow chart illustrating a facsimile transmission/reception control routine executed by the multi-function device.

DETAILED DESCRIPTION OF THE PREFERRED EMBODIMENTS

The preferred embodiment of this invention will be described in detail, by reference to the accompanying drawings.

(1) Overall Arrangement of Communication System

Figure 1:
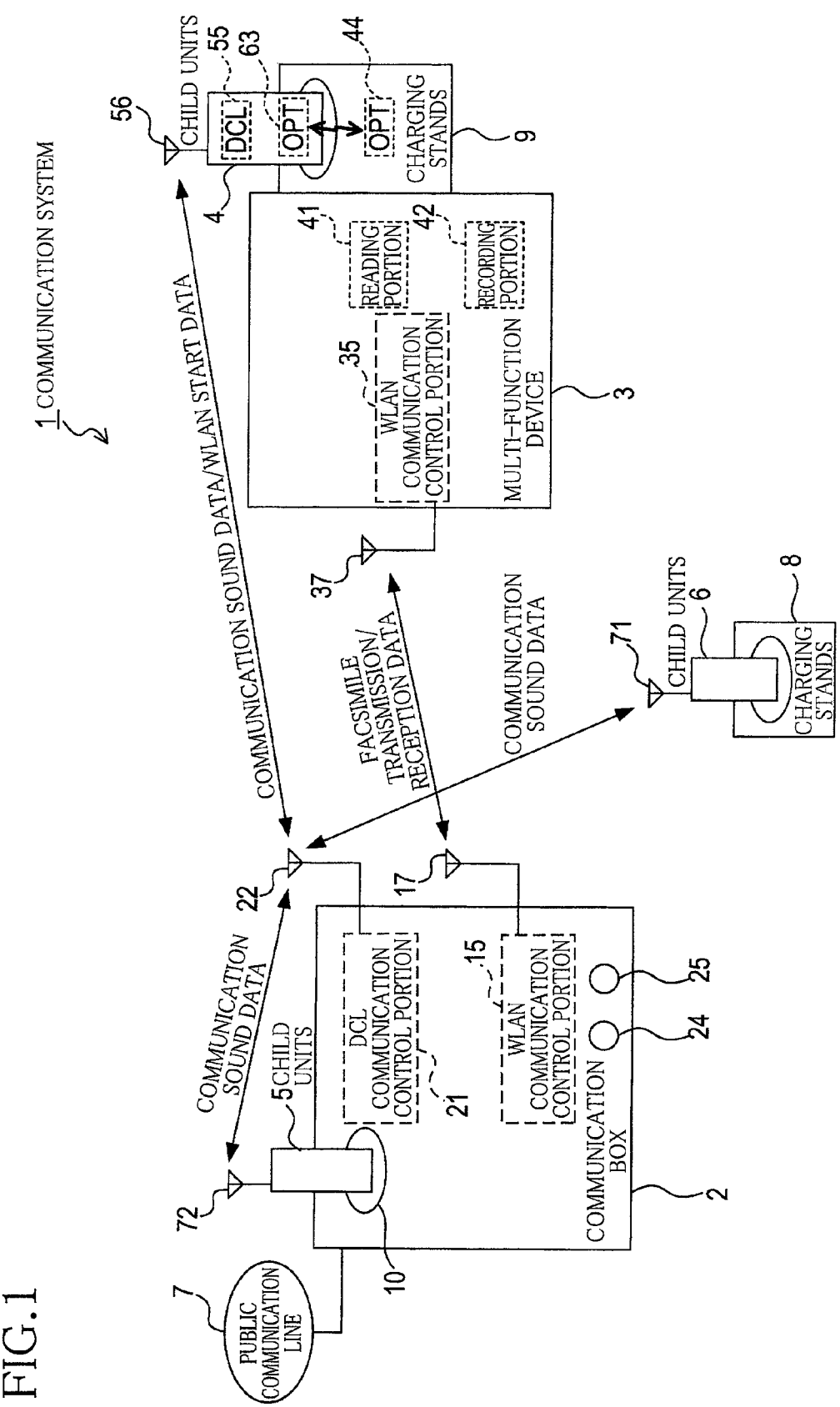
FIG. 1 is a schematic view showing an arrangement of a communication system constructed according to one embodiment of this invention.

Referring first to the schematic view of FIG. 1, there is shown an arrangement of a communication system 1 constructed according to the preferred embodiment of the present invention. As shown in FIG. 1, the communication system 1 includes a communication box 2 connected to a public communication line 7, a multi-function device 3, and a plurality of child units 4, 5 and 6 in the form of cordless handsets.

The communication box 2 is capable of transmission and reception of communication sound signals and facsimile data to and from external devices through the public communication line 7, and is operable to function as a parent unit with respect to the child units 4-6, in connection with a digital cordless telephone communication function, for transmission and reception of communication sound data to and from the child units 4-6.

Namely, the communication box 2 includes a DCL communication control portion 21 configured to effect the transmission and reception of the communication sound data to and from the child units 4, 5 and 6 in the digital cordless (abbreviated as "DCL") communication mode. In the specific example of the present embodiment, the DCL communication mode is a frequency hopping spread spectrum (FHSS) communication mode performed in a frequency band of 2.4 GHz. However, the DCL communication mode may be any other mode of communication in any other frequency band, provided the DCL communication mode is different from a mode of data communication with the multi-function device 3, that is, wireless LAN communication mode.

When telephone communication is effected between each child unit 4, 5, 6 and an external device (the other party), analog communication sound signals received by the communication box 2 from the public communication line 7 is modulated by the DCL communication control portion 21 into communication sound data for the DCL communication, and the communication sound data are transmitted from an antenna 22 in a wireless fashion. On the other hand, the communication sound data received by the antenna 22 from each child unit 4, 5, 6 are demodulated by the DCL communication control portion 21 into the analog communication sound signals, and the analog communication sound signals are transmitted to the public communication line 7.

The communication box 2 further includes a WLAN communication control portion 15 configured to effect the transmission and reception of the facsimile data to and from the multi-function device 3 in the wireless LAN (abbreviated as "WLAN") communication mode. In the specific example of the present embodiment, the WLAN communication mode is a direct sequence spread spectrum (DSSS) communication mode performed in a frequency band of 2.4 GHz. However, the WLAN communication mode may be any other mode of communication performed in any other frequency band.

The facsimile data received from the public communication line 7 (hereinafter referred to as "facsimile reception data") are modulated by the WLAN communication control portion 15 into facsimile transmission data for the WLAN communication, and the facsimile transmission data are transmitted from an antenna 17 in a wireless fashion. On the other hand, the facsimile data received by the antenna 17 from the multi-function device 3 (hereinafter referred to as "facsimile transmission data") are demodulated by the WLAN communication control portion 15 into the facsimile transmission data to be transmitted to the public communication line 7.

As described above, the communication box 2 is configured to effect the data communication (transmission and reception of the communication sound data) in the DCL communication mode of the DCL communication control portion 21 with respect to the child units 4-6, and the data communication (transmission and reception of the facsimile data) in the WLAN communication mode of the WLAN communication control portion 15 with respect to the multi-function device 3.

While the communication box 2 is placed in an operating state with power application thereto, however, the DCL communication control portion 21 is always held in an operating state, and the WLAN communication control portion 15 is placed in an operating state with power application thereto only while the data communication is effected with respect to the multi-function device 3, but is placed in a non-operating state with power removal therefrom while the data communication is not effected with respect to the multi-function device 3. The operation of the WLAN communication control portion 15 (power application and removal, in particular) will be described in detail.

The communication box 2 has a charging stand 10 in which the child unit 4, 5, 6 is installed to charge the child unit 4, 5, 6. In the charging stand 10 shown in FIG. 1, the child unit 5 is installed. The communication box 2 performs a function of a caretaker when none of the child units 4-6 responds to a telephone call received from the public communication line 7. That is, in the event of absence of a reply from any of the child units 4-6 to the telephone call from the public communication line 7, the communication box 2 generates a voice message informing the other party that none of the child units 4-6 are attended by any person, records a voice message left by the other party, and turns on a caretaker LED 24. When the communication box 2 receives facsimile data from the public communication line 7, the communication box 2 turns on a facsimile reception indicator LED 25.

In the present communication system 1, the communication box 2 is configured to transmit the facsimile reception data received from the public communication line 7, to the multi-function device 3. In some situations, however, the facsimile transmission data cannot be transmitted to the multi-function device 3 as the facsimile transmission data are received from the public communication line 7 or immediately after the facsimile transmission data are received from the public communication line 7, as described later in detail. In this case, the communication box 2 blinks the facsimile reception indicator LED 25, informing the user that the received facsimile reception data have not been transmitted to the multi-function device 3, as also described later in detail.

The multi-function device 3 has a plurality of functions including a facsimile function to effect transmission and reception of facsimile data through the communication box 2 and the public communication line 7, a printing function and a copying function. For performing the facsimile function, the multi-function device 3 includes a WLAN communication control portion 35 configured to effect the transmission and reception of facsimile data to and from the communication box 2 in the WLAN communication mode, a reading portion 41 configured to read images on an original for transmission of facsimile data, and a recording portion 42 configured to record or print, on a recording medium such as a sheet of paper, the images represented by the facsimile reception data received from the communication box 2.

That is, the communication box 2 is configured to effect the transmission and reception of facsimile data to and from the public communication line 7, and is not configured to perform a function of recording or printing the images represented by the received facsimile data and a function of reading the images on an original for facsimile transmission. These recording and reading functions are performed by the multi-function device 3 provided separately from or independently of the communication box 2. Thus, the facsimile data transmission and reception function is performed by the communication box 2, while the recording and reading functions are performed by the multi-function device 3, so that the freedom of installation of the component devices 2, 3 of the communication system 1 and the convenience of use of the component devices 2, 3 on the side of the user are accordingly improved.

The arrangement and operation of the WLAN communication control portion 35 of the multi-function device 3 are similar to those of the WLAN communication control portion 15 of the communication box 2 described above. The multi-function device 3 includes an antenna 37 through which the facsimile data are transmitted and received by the WLAN communication control portion 35 in the WLAN communication mode.

Like the WLAN communication control portion 15 of the communication box 2, the WLAN communication control portion 35 of the multi-function device 3 is held in a non-operated with power removal therefrom while the data communication with the communication box 2 is not effected, even while the multi-function device 3 is placed in the operating state with power application thereto. That is, the WLAN communication control portion 35 is placed in an operating state only while the data communication with the communication box 2 is effected. The operation of the WLAN communication control portion 35 (power application and removal, in particular) will be described in detail.

Thus, the present communication system 1 is configured such that both the WLAN communication control portion 15 of the communication box 2 and the WLAN communication control portion 35 of the multi-function device 3 are held in the non-operated state with power removal therefrom while the communication system 1 is placed in a standby state without transmission and reception of facsimile data. While the WLAN communication control portions 15, 35 are both in the off state with power removal therefrom, the facsimile data cannot be transmitted from one of the communication box 2 and multi-function device 3 to the other, for example, even if this transmission of the facsimile data is required.

To permit the transmission of the facsimile data from one of the communication box 2 and multi-function device 3 to the other, the communication system 1 constructed according to the present embodiment of the invention is configured such that the above-indicted one device 2, 3 informs the other device 2, 3 through the child unit 4 that the facsimile data will be transmitted from the one device to the other device. Namely, the above-indicated one device 2, 3 requires the other device 2, 3 to turn on the WLAN communication control portion 15, 35 of the other device 2, 3 to permit the transmission and reception of the facsimile data between the two devices 2, 3 in the WLAN communication mode. At the same time, the above-indicated one device 2, 3 turns on its WLAN communication control portion 15, 35.

Described in detail, the multi-function device 3 is provided with a charging stand 9 for charging the corresponding child unit 4, to and from which a signal can be transmitted and received by the multi-function device 3. The charging stand 9 incorporates a signal detecting portion (OPT) 44 configured for transmission of a signal to and from the child unit 4.

The signal detecting portion 44 permits the multi-function device 3 to transmit and receive the signal to and from the child unit 4 set in the charging stand 9. This signal is an optical signal which can be easily transmitted and received for optical communication with the multi-function device 3, with an extremely small amount of electric energy consumption while the multi-function device 3 is placed in the operating state with power application thereto.

When the facsimile data are transmitted from the multi-function device 3 to the communication box 2, the multi-function device 3 effects the optical communication with the child unit 4, as described above, and the child unit 4 effects data communication with the communication box 2 in the DCL communication mode, to require the communication box 2 to start its WLAN communication control portion 15. When the facsimile data received from the public communication line 7 are transmitted from the communication box 2 to the multi-function device 3, on the other hand, the communication box 2 effects data communication with the child unit 4 in the DCL communication mode, and the child unit 4 effects optical communication with the multi-function device 3, to require the multi-function device 3 to start its WLAN communication control portion 35.

The child unit 4 incorporates a signal detecting portion (OPT) 63 configured to effect optical communication with the multi-function device 3, and a DCL communication control portion 55 configured to effect data communication with the communication box 2 in the DCL communication mode, and is provided with an antenna 56 for transmission and reception of various kinds of data to and from the communication box 2.

The data transmitted and received between the communication box 2 and the child unit 4 include not only the communication sound data transmitted and received through a digital cordless telephone function, but also WLAN start data for starting the WLAN communication portion 15, 35 of one of the communication box 2 and multi-function device 3, which WLAN start data are transmitted from the other device 2, 3 to the above-indicated one device 2, 3 when the facsimile data is transmitted from the above-indicated other device 2, 3 to the above-indicated one device 2, 3. The WLAN start data mean data in general transmitted from one of the devices 2, 3 to the other for starting the WLAN communication control portion 15, 35 of the other device.

The child unit 5 installed in the charging stand 10 in the communication box 2 and the child unit 6 installed in a charging stand 8 are identical in construction with the child unit 4 installed in the charging stand 9 of the multi-function device 3. The child units 5, 6 are provided with respective antennas 72, 71 for transmission and reception of the communication sound data to and from the communication box 2, and incorporate a signal detecting portion and a DCL communication control portion (not shown) for optical communication with the multi-function device 3.

As shown in FIG. 1, the charging stand 8 is a stand-alone charging stand separately installed from the communication box 2 and multi-function device 3. Any one of the child units 4-6 can be installed or set in any one of the charging stands 8-10.

(2) Arrangement of Communication Box

Figure 2:
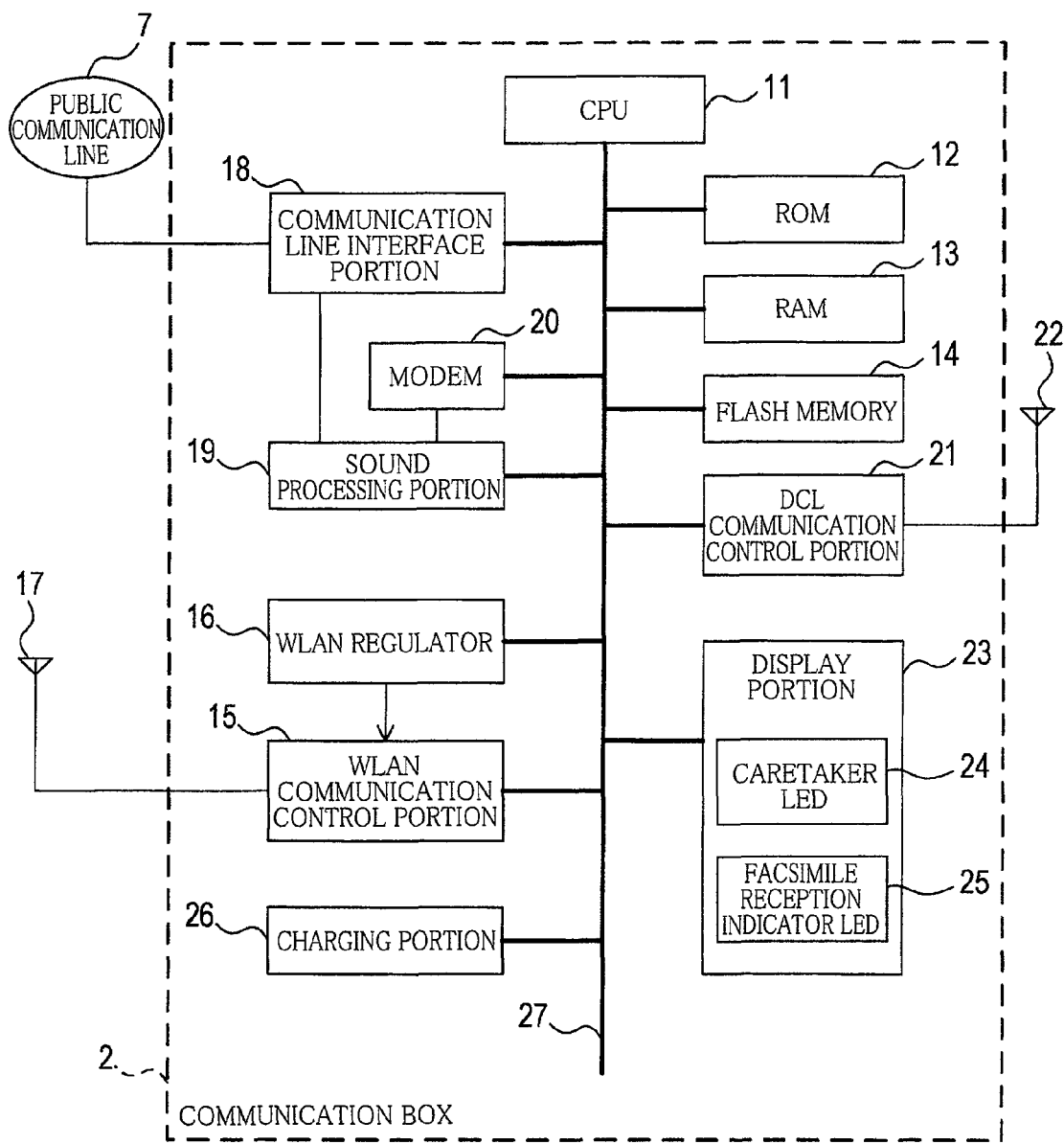
FIG. 2 is a block diagram showing an arrangement of a communication box of the communication system of FIG. 1.

Referring next to the block diagram of FIG. 2, the arrangement of the communication box 2 will be described in detail. As shown in FIG. 2, the communication box 2 includes a CPU 11, a ROM 12, a RAM 13, a flash memory 14, a display portion 23, a communication line interface portion 18, a sound processing portion 19, a MODEM 20 and a charging portion 26. The CPU 11 is configured to execute various control programs for performing various functions of the communication box 2 such as the facsimile function and the digital cordless telephone function. The control programs include a program for executing a facsimile transmission/reception control routine illustrated in the flow chart of FIG. 6 which will be described. The ROM 12 stores those control programs, and the RAM 13 temporarily stores various kinds of data when the control programs are executed by the CPU 11. The flash memory 14 stores various kinds of data such as the received facsimile data and voice messages, and a caretaker reply message. The display portion 23 has the above-described caretaker LED 24 and facsimile reception indicator LED 25. The communication line interface portion 18 is connected to the public communication line 7, and configured to generate a dialing signal, send a reply to a call signal received from the public communication line 7 and to transmit and receive the communication sound signal and facsimile data. The sound processing portion 19 is configured to effect various processing operations of the communication sound signal (e.g., analog-digital conversion and signal routing). The MODEM 20 is configured to modulate the facsimile transmission data transmitted from the multi-function device 3, into an image signal that can be transmitted to the public communication line 7, and to demodulate the facsimile reception data received from the public communication line 7. The charging portion 26 is configured to control the operation to charge the child unit 5 installed in the charging stand 10. The above-described various components of the communication box 2 are interconnected to each other through a bus 27.

As described above by reference to FIG. 1, the communication box 2 includes the DCL communication control portion 21 provided with the antenna 22 and configured to transmit and receive the communication sound data and WLAN start data to and from the child units 4-6 in the DCL communication mode, the WLAN communication control portion 15 provided with the antenna 17 and configured to transmit and receive the facsimile data to and from the multi-function device 3 in the WLAN communication mode, and a WLAN regulator 16 configured to generate an electric energy to operate the WLAN communication control portion 15. These DCL communication control portion 21, WLAN communication control portion 15 and WLAN regulator 16, as well as the above-described components of the communication box 2, are also interconnected to each other through the bus 27.

The data communication by the WLAN communication control portion 15 and the data communication by the DCL communication control portion 21 are both controlled by the CPU 11. The generation of the electric energy by the WLAN regulator 16 is also controlled by the CPU 11. In the standby state of the communication box 2 in which the transmission and reception of the facsimile data to and from the multi-function device 3 are not effected, the generation of the electric energy by the WLAN regulator 16 is stopped to inhibit a supply of the electric energy to the WLAN communication control portion 15 for turning off the WLAN communication control portion 15.

(3) Arrangement of Multi-Function Device 3

Figure 3:
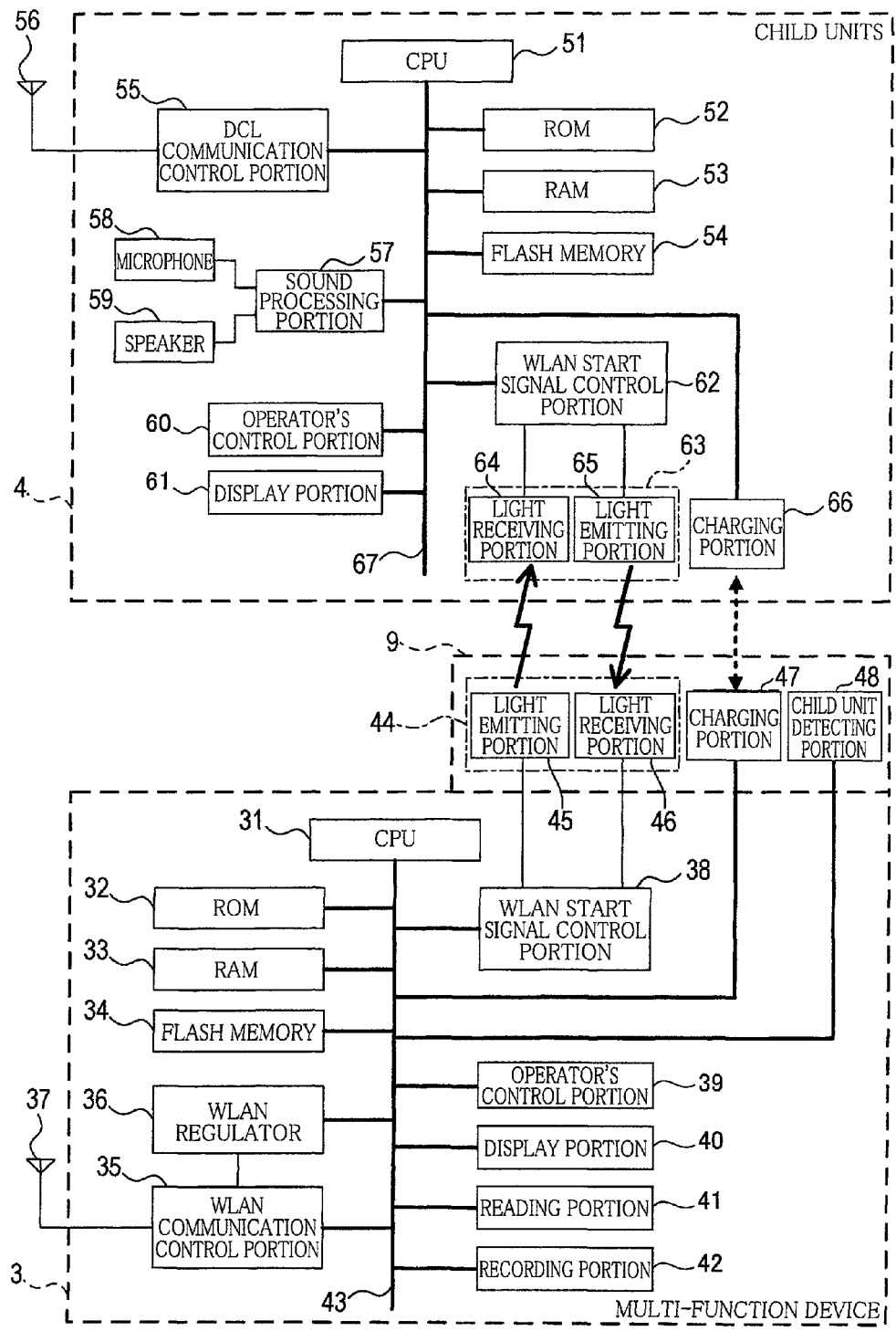
FIG. 3 is a block diagram showing arrangements of a child unit and a multi-function device of the communication system of FIG. 1.

Referring next to FIG. 3, the arrangement of the multi-function device 3 will be described in detail. As shown in FIG. 3, the multi-function device 3 includes a CPU 31, a ROM 32, a RAM 33, a flash memory 34, an operator's control portion 39, a display portion 40 (in the form of a liquid crystal display, for example), a reading portion 41 and a recording portion 42. The CPU 31 is configured to execute various control programs for performing various functions of the multi-function device 3 such as the facsimile function, printing function and copying function. The control programs include a program for executing a facsimile transmission/reception control routine illustrated in the flow chart of FIG. 8 which will be described. The ROM 32 stores those control programs, and the RAM 33 temporarily stores various kinds of data when the control programs are executed by the CPU 31. The flash memory 34 stores various kinds of data such as the facsimile data received from the communication box 2 and the facsimile data to be transmitted from the multi-function device 3. The operator's control portion 39 has various control keys and pushbuttons operated by the user to perform the various functions of the multi-function device 3, such as numeral keys for entering facsimile numbers of the other party for facsimile transmission. The display portion 40 is configured to indicate the operating states and menu of the multi-function device 3 in connection with the above-descried various functions. The reading portion 41 is configured to read the images of the original for the facsimile transmission function and copying function and to generate data representative of the read images. The recording portion 42 is configured to record or print, on the recording medium such as a sheet of paper, the facsimile reception data received from the communication box 2 or the images read by the reading portion 41. The above-described various components of the multi-function device 3 are interconnected to each other through a bus 43.

As described above by reference to FIG. 1, the multi-function device 3 includes the WLAN communication control portion 35 provided with the antenna 37 and configured to transmit and receive the facsimile data to and from the communication box 2, and a WLAN regulator 36 configured to generate an electric energy to operate the WLAN communication control portion 35. These WLAN communication control portion 35 and WLAN regulator 36, as well as the above-described components of the multi-function device 3, are also interconnected to each other through the bus 43.

The data communication by the WLAN communication control portion 35 is controlled by the CPU 31. The generation of the electric energy by the WLAN regulator 36 is also controlled by the CPU 31. In the standby state of the multi-function device 3 in which the transmission and reception of the facsimile data to and from the communication box 2 are not effected, the generation of the electric energy by the WLAN regulator 36 is stopped to inhibit a supply of the electric energy to the WLAN communication control portion 35 for turning off the WLAN communication control portion 35.

As described above by reference to FIG. 1, the multi-function device 3 is provided with the charging stand 9 for charging the child unit 4. The charging stand 9 incorporates a signal detecting portion 44 which consists of a light emitting portion 45 and a light receiving portion 46 and which is configured to effect optical communication with the child unit 4. The child unit 4 is also provided with the signal detecting portion 63 consisting of a light emitting portion 64 and a light receiving portion 65.

When the child unit 4 is installed in the charging stand 9, the light emitting portion 45 of the multi-function device 3 and the light receiving portion 64 of the child unit 4 are opposed to each other, while the light receiving portion 46 of the multi-function device 3 and the light emitting portion 65 of the child unit 4 are opposed to each other. That is, the multi-function device 3 is arranged to permit the signal transmission and reception (optical communication) with the child unit 4 while the child unit 4 is installed in the charging stand 9.

In the multi-function device 3, the operation of the signal detecting portion 44 is controlled by a WLAN start signal control portion 38 according to a command received from the CPU 31. Namely, the WLAN start signal control portion 38 is configured to activate the light emitting portion 45 for emitting a light to be sent to the child unit 4 when the multi-function device 3 requires the communication box 2 to start the WLAN communication control portion 15. Described in detail, the light emitting portion 45 is activated to emit the light in a predetermined pattern corresponding to the desired signal to be sent to the child unit 4.

When the signal (light emitted in the predetermined pattern) emitted from the child unit 4 is received by the light receiving portion 46 according to the requirement by the communication box 2 to start the WLAN communication control portion 35 of the multi-function device 3, the light receiving portion 46 generates a signal representative of the received signal on the basis of the predetermined pattern of reception of the light.

The multi-function device 3 further includes a charging portion 47 configured to control an operation to charge the child unit 4 installed in the charting stand 9, and a child unit detecting portion 48 configured to detect the child unit 4 installed in the charging stand 9. These charging portion 47 and the child unit detecting portion 48, as well as the other various components of the multi-function device 3 described above, are interconnected to each other through the bus 43. It is noted that the child unit detecting portion 48 is arranged to detect the child unit 4 installed in the charging stand 9, by suitable detecting means, for example, by a switch which is turned on by a bottom portion of the child unit 4 when the child unit 4 is installed in the charging stand 9.

(4) Arrangement of Child Unit

The arrangement of the child unit 4 will then be described by reference to FIG. 3. As shown in the figure, the child unit 4 includes a CPU 51, a ROM 52, a RAM 53, a flash memory 54, a sound processing portion 57, a microphone 58, a speaker 59, an operator's control portion 60, a display portion 61 (in the form of a liquid crystal display, for example), and a charging portion 66. The CPU 51 is configured to execute various control programs for performing various functions of the child unit 4 such as the digital cordless telephone function, and the optical communication function with respect to the multi-function device 3. The control programs include a program for executing a WLAN start control routine illustrated in the flow chart of FIG. 7 which will be described. The ROM 52 stores those control programs, and the RAM 53 temporarily stores various kinds of data when the control programs are executed by the CPU 51. The flash memory 54 stores various kinds of data such telephone number data. The microphone 58 receives a sound generated by the user, while the speaker 59 generates a sound according to the communication sound signal received through the antenna 56. The sound processing portion 57 is configured to control the sound reception by the microphone 58 and the sound generation by the speaker 59. The operator's control portion 60 has numeral keys and various function keys. The display portion 61 is configured to indicate the operating states and menu of the child unit 4. The charging portion 66 is configured to receive the electric energy from the charging portion 47 of the multi-function device 3, and to control an operation to charge a battery (not shown). The above-described various components of the child unit 4 are interconnected to each other through a bus 67.

As described above by reference to FIG. 1, the child unit 4 includes the DCL communication control portion 55 provided with the antenna 56 and configured to transmit and receive the communication sound data and WLAN start data to and from the communication box 2 in the DCL communication mode, and the signal detecting portion 63 configured to effect the optical communication with the multi-function device 3, and a WLAN start signal control portion 62 configured to control the signal detecting portion 63.

Like the signal detecting portion 44 of the multi-function device 3, the signal detecting portion 63 includes a light emitting portion 65 and a light receiving portion 64. Like the operations of the light emitting portion 45 and light receiving portion 46 of the signal detecting portion 44, the operations of the light emitting portion 65 and light receiving portion 64 are controlled by the WLAN start signal control portion 62 such that the signals transmitted and received to and from the multi-function device 3 are discriminated according to the pattern of light emission and the pattern of light reception.

(5) Basic Facsimile Transmission and Reception Operations

Figure 4:
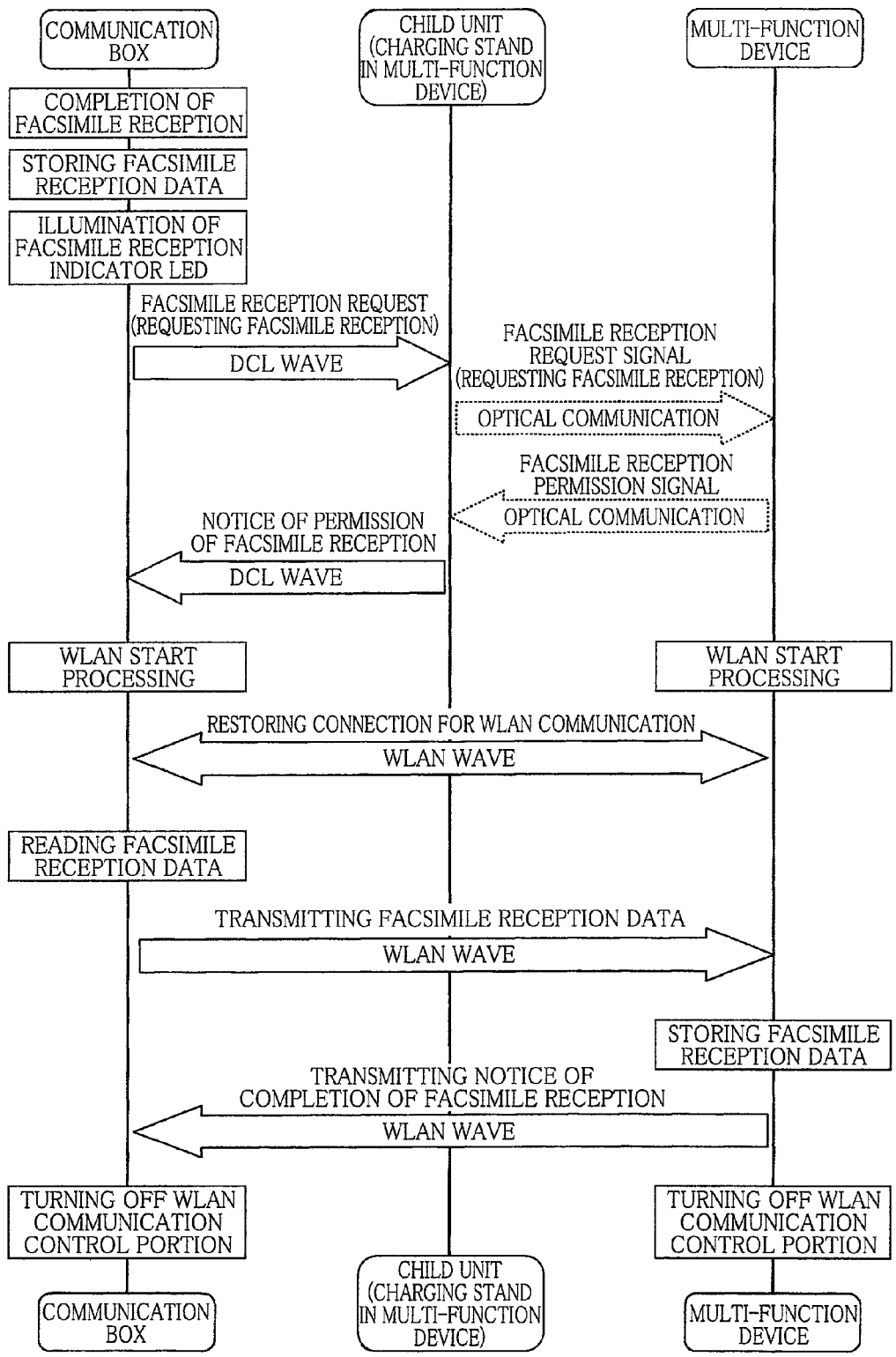
FIG. 4 is a sequence chart indicative of basic facsimile data reception operations in the communication system of FIG. 1.

Then, basic operations of the present communication system 1 for transmission and reception of facsimile data will be described by reference to the sequence charts of FIGS. 4 and 5.

Initially, the basic operations to receive the facsimiled data will be described by reference to FIG. 4. As indicated in this figure, the communication box 2 which has received the facsimile data from the public communication line 7 completes processing of reception of the facsimile data, stores the facsimile reception data in the flash memory 14, and illuminates the facsimile reception indicator LED 25. Then, the communication box 2 transmits to the multi-function device 3 a facsimile reception request through a DCL wave (that is, in the DCL communication mode). The facsimile reception request is transmitted to require the multi-function device 3 to start its WLAN communication control portion 35 and to receive the facsimile reception data.

When the child unit 4 installed in the charging stand 9 of the multi-function device 3 has received the facsimile reception request from the communication box 2 through the DCL wave, the child unit 4 transmits to the multi-function device 3 a facsimile reception request signal in the optical communication mode. When the multi-function device 3 has received the facsimile reception request signal from the child unit 4 in the optical communication mode, the multi-function device 3 transmits a facsimile reception permission signal to the child unit 4 in the optical communication mode, in response to the facsimile reception request signal. The child unit 4 which has received the facsimile reception permission signal from the multi-function device 3 in the optical communication mode transmits a notice of permission of facsimile reception to the communication box 2 through the DCL wave.

The communication box 2 which has received the notice of permission of facsimile reception from the child unit 4 starts its WLAN communication control portion 15, that is, activates the WLAN regulator 16 to supply the electric energy to the WLAN communication control portion 15. On the other hand, the multi-function device 3 transmits the facsimile reception permission signal to the child unit 4, and starts its WLAN communication control portion 35, that is, activates the WLAN regulator 36 to supply the electric energy to the WLAN communication control portion 35.

Thus, both the WLAN communication control portion 15 of the communication box 2 and the WLAN communication control portion 35 of the multi-function device 3 are started to restore the connection for mutual communication through the WLAN wave (that is, in the WLAN communication mode), permitting the data communication through the WLAN wave.

Then, the communication box 2 reads out the facsimile reception data which have been received from the public communication line 7 and stored in the flash memory 14, and transmits the facsimile reception data to the multi-function device 3 through the WLAN wave.

The multi-function device 3 which has received the facsimile reception data from the communication box 2 through the WLAN wave stores the facsimile reception data in its flash memory 34, and transmits a notice of completion of reception of the facsimile reception data to the communication box 2 through the WLAN wave. Then, the multi-function device 3 turns off the electric energy supply to the WLAN communication control portion 35, namely, commands the WLAN regulator 36 to stop the electric energy supply to the WLAN communication control portion 35, for thereby stopping the operation of the WLAN communication control portion 35.

The communication box 2 which has transmitted the facsimile reception data to the multi-function device 3 and received the notice of completion of reception of the facsimile reception data from the multi-function device 3 through the WLAN wave turns off the electric energy supply to its WLAN communication control portion 15, namely, commands the WLAN regulator 16 to stop the electric energy supply to the WLAN communication control portion 15, for thereby stopping the operation of the WLAN communication control portion 15.

After the facsimile transmission data have been transmitted from the communication box 2 to the multi-function device 3, the facsimile reception data once stored in the flash memory 14 may be erased, or may be retained in the flash memory 14, depending upon a need on the side of the user of the communication system 1.

In the multi-function device 3, the facsimile reception data may be recorded or printed by the recording portion 42 soon after the facsimile reception data have been stored in the flash memory 34, or may be erased after the recording operation by the recording portion 42, depending upon a need on the side of the user of the communication system 1.

Figure 5:
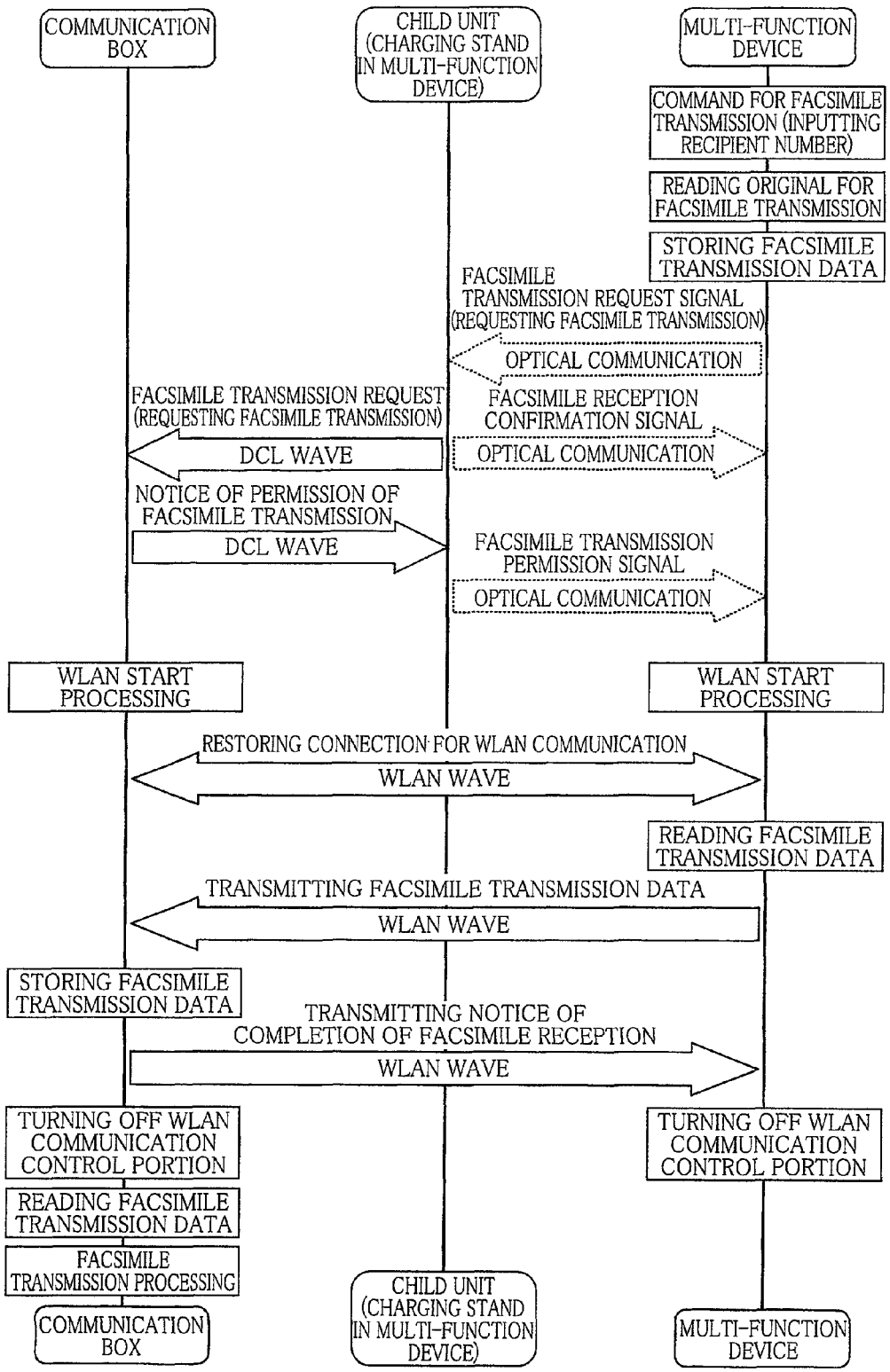
FIG. 5 is a sequence chart indicative of basic facsimile data transmission operations in the communication system of FIG. 1.

Referring next to FIG. 5, there will be described the basic operation to transmit the facsimile data. When the transmission of the facsimile data is required with an operation to input the facsimile number of the recipient of the facsimile transmission data, the original for the facsimile transmission is read by the reading portion 41, as the facsimile transmission data, and the facsimile transmission data are stored in the flash memory 34, as indicated in FIG. 5. Then, the multi-function device 3 transmits a facsimile transmission request signal to the child unit 4 in the optical communication mode. The facsimile transmission request signal is transmitted to require the communication box 2 to start its WLAN communication control portion 15 and to receive the facsimile transmission data and transmit the facsimile transmission data to the public communication line 7.

When the child unit 4 installed in the charging stand 9 of the multi-function device 3 has received the facsimile transmission request signal from the multi-function device 3 in the optical communication mode, the child unit 4 transmits to the multi-function device 3 a facsimile reception confirmation signal in the optical communication mode, in response to the facsimile transmission request signal, and transmits a facsimile transmission request to the communication box 2 through the DCL wave.

The communication box 2 which has received the facsimile transmission request from the child unit 4 transmits a notice of permission of facsimile transmission to the child unit 4 through the DCL wave, in response to the facsimile transmission request. The child unit 4 which has received the notice of permission of facsimile transmission from the communication box 2 transmits a facsimile transmission permission signal to the multi-function device 3 in the optical communication mode.

The communication box 2 which has received the facsimile transmission request from the child unit 4 starts its WLAN communication control portion 15. On the other hand, the multi-function device 3 which has sequentially received the facsimile reception confirmation signal and the facsimile transmission permission signal from the child unit 4 starts its WLAN communication control portion 35. Thus, both the WLAN communication control portion 15 of the communication box 2 and the WLAN communication control portion 35 of the multi-function device 3 are started to restore the connection for mutual communication through the WLAN wave (that is, in the WLAN communication mode), permitting the data communication through the WLAN wave.

Then, the multi-function device 3 reads out the facsimile transmission data stored in the flash memory 34 as a result of reading of the original, and transmits the facsimile transmission data to the communication box 2 through the WLAN wave, together with the facsimile number of the recipient.

The communication box 2 which has received the facsimile transmission data from the multi-function device 3 through the WLAN wave stores the facsimile transmission data in its flash memory 14, and transmits a notice of completion of reception of the facsimile transmission data to the multi-function device 3 through the WLAN wave. Then, the communication box 2 turns off the electric energy supply to the WLAN communication control portion 15. The communication box 2 then reads out the facsimile transmission data from the flash memory 14 and transmits the facsimile transmission data to the recipient through the public communication line 7.

When the multi-function device 3 receives the notice of completion of facsimile reception from the communication box 2 through the WLAN wave after the facsimile transmission data have been transmitted to the communication box 2, the multi-function device 3 turns off its WLAN communication control portion 35.

After the facsimile transmission data have been transmitted from the multi-function device to the communication box 2, the facsimile transmission data once stored in the flash memory 34 may be erased, or may be retained in the flash memory 34, depending upon a need on the side of the user of the communication system 1.

In the communication box 2, the facsimile transmission data received from the multi-function device 3 may be erased from the flash memory 14 soon after the facsimile transmission data have been transmitted to the public communication line 7, or may be retained in the flash memory 14, depending upon a need on the side of the user of the communication system 1.

(6) Control Routines Executed by Communication Box, Multi-function Device and Child Unit Upon Facsimile Transmission/Reception Referring to the flow charts of FIGS. 6-8, there will be described the control routines executed by the communication box 2, multi-function device 3 and child unit 4 upon a facsimile transmission/reception operation of the present communication system 1.

(6-1) Facsimile Transmission/Reception Control Routine Executed by Communication Box Referring first to the flow chart of FIG. 6, there will be described the facsimile transmission/reception control routine executed by the communication box 2. This facsimile transmission/reception control routine is repeatedly executed by the CPU 11 of the communication box 2 with a predetermined cycle time. The control routine is initiated with step S110 to determine whether there are facsimile reception data to be transmitted to the multi-function device 3.

It is not always possible to transmit the facsimile reception data to the multi-function device 3 as soon as the communication box 2 has received the facsimile reception data from the public communication line 7. Namely, it is not possible to transmit the facsimile reception data from the communication box 2 to the multi-function device 3 if the child unit 4 is not set in the multi-function device 3, or if the multi-function device 3 is placed in the off state without power application thereto. If it is not possible for the communication box 2 to transmit the facsimile reception data to the multi-function device 3, information indicating this fact is stored in the RAM 13. For example, a flag indicating this fact is set in the RAM 13. At the same time, the facsimile reception indicator LED 25 is activated to blink, for the purpose of informing the user that the communication box 2 has the facsimile reception data to be transmitted to the multi-function device 3.

If there are not facsimile reception data to be transmitted to the multi-function device 3, that is, if a negative determination (NO) is obtained in step S110, the control flow goes to step S130 to determine whether facsimile transmission data have been received from the public communication line 7. If there are facsimile reception data to be transmitted to the multi-function device 3, that is, if an affirmative determination (YES) is obtained in step S110, the control flow goes to step S120 to determine whether a command has been entered by the user to transmit the facsimile reception data from the communication box 2 to the multi-function device 3. If a negative determination (NO) is obtained in step S120, the control flow goes to step S130. If an affirmative determination (YES) is obtained in step S120, the control flow goes to step S170. For instance, the communication box 2 is provided with a switch which is operated by the user to command the communication box 2 to transmit the facsimile reception data to the multi-function device 3.

If the facsimile data have been received from the public communication line 7, the control flow goes to step S140 to perform a processing operation to receive the facsimile reception data, then to step S150 to store the facsimile reception data in the flash memory 14, and then to step S160 to illuminate the facsimile reception indicator LED 25. Step S160 is followed by the above-indicated step S170 to transmit the facsimile reception request to the child unit 4 through the DCL wave.

Step S170 is followed by step S180 to determine whether the notice of permission of facsimile reception has been received from the child unit 4 through the DCL wave. If a negative determination (NO) is obtained in step S180, the control flow goes to step S190 to determine whether a predetermined time has elapsed. Step S180 is repeatedly implemented until an affirmative determination (YES) is obtained in step S190. If the predetermined time has elapsed without reception of the notice of permission of facsimile reception, that is, if the affirmative determination (YES) is obtained in step S190, the control flow goes to step S250 to blink the facsimile reception indicator LED 25, and one cycle of execution of the present facsimile transmission/reception control routine is terminated.

If the notice of permission of facsimile reception has been received from the child unit 4 before the predetermined time has elapsed, that is, if an affirmative determination (YES) is obtained in step S180, the control flow goes to step S200 to start the WLAN communication control portion 15, to enable at least the communication box 2 to operate in the WLAN communication mode. Then, the control flow goes to step S210 read out the facsimile reception data from the flash memory 14. If there are any facsimile reception data which have been received but have not been transmitted to the multi-function device 3, namely, if an affirmative determination (YES) is obtained in step S120, the above-indicated facsimile reception data as well as the facsimile reception data received in step S130 are read out from the flash memory 14.

Step S210 is followed by step S220 to transmit the read-out facsimile reception data to the multi-function device 3 through the WLAN wave, and step S230 to determine whether the notice of completion of facsimile reception has been received from the multi-function device 3 through the WLAN wave. If a negative determination (NO) is obtained in step S230, the communication box 2 determines that the facsimile reception data have not been transmitted in step S220, and the control flow goes to step S250 to activate the facsimile reception indicator LED 25 to blink.

If the notice of completion of facsimile reception has been received from the multi-function device 3, that is, if an affirmative determination (YES) is obtained in step S230, the control flow goes to step S240 to turn off the power supply to the WLAN communication control portion 15, for stopping its operation, and one cycle of execution of the present facsimile transmission/reception control routine is terminated.

If the facsimile reception data have not been received from the public communication line 7, that is, if a negative determination (NO) is obtained in step S130, the control flow goes to step S260 to determine whether the facsimile transmission request has been received from the child unit 4 through the DCL wave, that is, whether the multi-function device 3 has required the communication box 2 to start its WLAN communication control portion 15, for transmitting the facsimile transmission data to the public communication line 7.

If a negative determination (NO) is obtained in step S260, one cycle of execution of the present transmission/reception control routine is terminated. If an affirmative determination (YES) is obtained in step S260, the control flow goes to step S270 to transmit the notice of permission of facsimile transmission to the child unit 4 through the DCL wave, and then to step S280 to start its WLAN communication control portion 15.

Step S280 is followed by step S290 to determine whether facsimile transmission data have been received from the multi-function device 3 through the WLAN wave. If an affirmative determination (YES) is obtained in step S290, the control flow goes to step S300 to store the facsimile transmission data in the flash memory 14, and then to step S310 to transmit the notice of completion of reception of the facsimile transmission data to the multi-function device 3 through the WLAN wave.

The control flow then goes to step S320 to turn off the WLAN communication control portion 15 by removing power therefrom, for stopping its operation. Then, the control flow goes to step S330 to read out the facsimile transmission data from the flash memory 14, and to step S340 to perform a processing operation to transmit the facsimile transmission data to the public communication line 7.

(6-2) Wireless LAN Start Control Routine Executed by Child Unit

Referring next to the flow chart of FIG. 7, there will be described the WLAN start control routine executed by the child unit 4. This WLAN start control routine is repeatedly executed by the CPU 51 of the child unit with a predetermined cycle time. The control routine is initiated with step S410 to determine whether the facsimile reception request has been received from the communication box 2 through the DCL wave.

If the facsimile reception request has not been received from the communication box 2, that is, if a negative determination (NO) is obtained in step 5410, the control flow goes to step S450 to determine whether the facsimile transmission request signal has been received from the multi-function device 3 in the optical communication mode. If a negative determination (NO) is obtained in step S450, one cycle of execution of the present WLAN start control routine is terminated.

If the facsimile reception request signal has been received from the communication box 2, that is, if an affirmative determination (YES) is obtained in step S410, the control flow goes to step S420 to transmit the facsimile reception request signal to the multi-function device 3 in the optical communication mode, and then to step S430 to determine whether the facsimile reception permission signal has been received from the multi-function device 3 in the optical communication mode, in response to the facsimile reception request signal transmitted to the multi-function device 3.

If a negative determination (NO) is obtained in step S430, one cycle of execution of the present control routine is terminated. If an affirmative determination (YES) is obtained in step S430, the control flow goes to step S440 to transmit the notice of permission of facsimile reception to the communication box 2 through the DCL wave.

If the facsimile transmission request signal has been received from the multi-function device 3 in the optical communication mode in step S450, that is, if an affirmative determination (YES) is obtained in step S450, the control flow goes to step S460 to transmit the facsimile reception confirmation signal to the multi-function device 3 in the optical communication mode, and then to step S470 to transmit the facsimile transmission request to the communication box 2 through the DCL wave. Step S470 is followed by step S480 to determine whether the notice of permission of facsimile transmission has been received from the communication box 2 through the DCL wave.

If a negative determination (NO) is obtained in step S480, the control flow goes to step S500 to determine whether a predetermined time has elapsed. Step S480 is repeatedly implemented until an affirmative determination (YES) is obtained in step S500. If the predetermined time has elapsed without reception of the notice of permission of facsimile transmission, that is, if an affirmative determination (YES) is obtained in step S500, one cycle of execution of the present wireless WLAN start control routine is terminated.

If the notice of permission of facsimile transmission has been received before the predetermined time has elapsed, that is, if an affirmative determination (YES) is obtained in step S480, the control flow goes to step S490 to transmit the facsimile transmission permission signal to the multi-function device 3 in the optical communication mode, and one cycle of execution of the present control routine is terminated.

(6-3) Facsimile Transmission/Reception Control Routine Executed by Multi-function Device Referring to the flow chart of FIG. 8, there will be described the facsimile transmission/reception control routine executed by the multi-function device 3. This facsimile transmission/reception control routine is repeatedly executed by the CPU 31 of the multi-function device 3 with a predetermined cycle time. The control routine is initiated with step S610 to determine whether a command for the facsimile transmission has been entered by the user (whether an operation to input the facsimile number of the recipient has been performed by the user).

If a negative determination (NO) is obtained in step S610, the control flow goes to step S760 to determine whether the facsimile reception request signal has been received from the child unit 4 in the optical communication mode. If a negative determination (NO) is obtained in step S760, one cycle of execution of the present facsimile transmission/reception control routine is terminated.

If an affirmative determination (YES) is obtained in step S610, the control flow goes to step S620 to obtain the facsimile number of the recipient entered by the user, to step S630 to command the reading portion 41 to read the original for facsimile transmission, and then to step S640 to store the read facsimile transmission data in the flash memory 34. Step S640 is followed by step S650 to transmit the facsimile transmission request signal to the child unit 4 in the optical communication mode.

Then, the control flow goes to step S660 to determine whether the facsimile reception confirmation signal has been received from the child unit 4 in the optical communication mode. The facsimile reception confirmation signal is not received from the child unit 4 if the optical communication with the child unit 4 is not impossible, for example, if the child unit 4 is not installed in the charging stand 9 of the multi-function device 3. If a negative determination (NO) is obtained in step S660, therefore, the control flow goes to step S670 to provide an alarming indication or sound prompting the user to install the child unit 4 in the charging stand 9. The display 40 is activated to provide the alarming indication, or a suitable speaker provided in the multi-function device 3 is activated to generate the alarming sound.

If an affirmative determination (YES) is obtained in step S660, the control flow goes to step S680 to determine whether the facsimile transmission permission signal has been received from the child unit 4 in the optical communication mode. The facsimile reception confirmation signal described above with respect to step S660 is transmitted to confirm that optical communication is possible with the child unit 4 set in the multi-function device 3, while on the other hand the facsimile transmission permission signal described above with respect to step S680 is transmitted from the child unit 4 to confirm that the facsimile transmission permission signal has been transmitted from the communication box 2.

Even when the optical communication is possible with the child unit 4 installed in the charging stand 9 of the multi-function device 3, it is not always possible for the child unit 4 to effect data communication with the communication box 2 through the DCL wave. For instance, the data communication with the communication box 2 is not possible while the child unit 5 or 6 is in data communication with the communication box 2 through the DCL wave.

If the facsimile transmission permission signal has not been received from the child unit 4, that is, if a negative determination (NO) is obtained in step S680, the control flow goes to step S690 to determine whether a predetermined time has elapsed. Step S680 is repeatedly implemented until the predetermined time has elapsed, that is, until an affirmative determination (YES) is obtained in step S690. If the affirmative determination is obtained in step S690, the control flow goes to step S700 to provide an alarming indication or sound indicating that the facsimile transmission data cannot be transmitted If an affirmative determination (YES) is obtained in step S680, the control flow goes to step S710 to start its WLAN communication control portion 35, to enable at least the multi-function device 3 to operate in the WLAN communication mode. Then, the control flow goes to step S720 to read out the facsimile transmission data from the flash memory 34, to step S730 to transmit the read-out facsimile transmission data to the communication box 2 through the WLAN wave, and then to step S740 to determine whether the notice of completion of facsimile reception has been received from the communication box 2 through the WLAN wave. If an affirmative determination (YES) is obtained in step S740, the control flow goes to step S750 to turn off the WLAN communication control portion 35 by removing power therefrom, for stopping its operation, and one cycle of execution of the present control routine is terminated.

If an affirmative determination (YES) is obtained in step S760 while a negative determination (NO) is obtained in step S610, that is, if the facsimile reception request signal has been received from the child unit in the optical communication mode while the command for facsimile transmission is absent, the control flow goes to step S770 to transmit the facsimile reception permission signal to the child unit 4 in the optical communication mode, and then to step S780 to start the WLAN communication control portion 35.

Step S780 is followed by step S790 to determine whether the facsimile reception data have been received from the communication box 2 through the WLAN wave. If an affirmative determination (YES) is obtained in step S790, the control flow goes to step S800 to store the facsimile reception data in the flash memory 34, to step S819 to transmit the notice of completion of facsimile reception to the communication box 2 through the WLAN wave, and then to step S820 to turn off the WLAN communication control portion 35 by removing power therefrom, for stopping its operation.

There has been proposed a technique to reduce the electric energy consumption required for a wireless LAN communication in a radio or wireless communication system including two communication peripheral devices configured to effect the wireless LAN communication with each other. This wireless communication system has a short-distance wireless communication function (an NFC reader/writer) in addition to the wireless LAN communication function, and uses this short-distance wireless communication function for transmission and reception of information required for connection setting of the wireless LAN, so that the wireless LAN communication is effected after the information transmission and reception through the short-distance wireless communication function.

The technique indicated above requires both of the two communication peripheral devices configured to effect the wireless LAN communication, to have the short-distance wireless communication function (NFC reader/writer) for the information transmission and reception for the connection setting of the wireless LAN, in addition to the wireless LAN communication function, so that each of the two communication peripheral devices tends to be complicated in construction, giving rise to a problem of insufficient reduction of the required electric energy consumption by the wireless communication system as a whole.

The wireless LAN communication function is held off while the information transmission and reception for the connection setting of the wireless LAN is effected by the short-distance wireless communication function. After the wireless LAN communication function is effected after the connection setting, and is continued irrespective of whether data communication is actually effected between the communication peripheral devices. In this respect, too, it is hard to say that the reduction of the required electric energy consumption is sufficient.

Since the connection setting of the wireless LAN is effected during an operation of shot-distance wireless communication, so that the two communication peripheral devices must be located close to each other at least during the connection setting of the wireless LAN communication. Accordingly, sufficient reduction of the electric energy consumption and a high degree of freedom of installation of the communication box and image processing device are not actually expected for the cordless telephone communication system having the facsimile function, which includes the two separate devices consisting of the communication box and image processing device both of which have the short-distance wireless communication function in addition to the wireless LAN communication function, for the mutual communication of the two separate devices, as described above.

(7) Advantages of Preferred Embodiment, and Relationship Between Components of the Embodiment and Elements of Claimed Invention The communication system 1 constructed according to the illustrated embodiment described above is configured such that both of the WLAN communication control portion 15 of the communication box 2 and the WLAN communication control portion 35 of the multi-function device 3 are placed in the non-operating state with power removal therefrom to inhibit data communication therebetween through the WLAN wave while the transmission and reception of facsimile data are not effected between the two WLAN communication control portions 15, 35, and such that when one of the communication box 2 and multi-function device 3 is commanded to transmit facsimile data, this one device 2, 3 requires the other device 2, 3 to start its WLAN communication control portion 15, 35 through the child unit 4, that is, by utilizing the signal transmission and reception function by data communication through the DCL wave between the child unit 4 and the communication box 2 and by optical communication between the child unit 4 and the multi-function device 3, and starts its own WLAN communication control portion 15, 35, to permit the transmission and reception of the facsimile data between the communication box 2 and the multi-function device 3 through the WLAN wave.

When the communication box 2 has received the facsimile data from the public communication line 7, the communication box 2 transmit the facsimile reception request to the multi-function device 3 through the child unit 4, so that the starting of the WLAN communication control portion 35 of the multi-function device 3 is ensured by the facsimile reception request (which is eventually received as the facsimile reception request signal by the multi-function device 3). When the multi-function device 3 requires to transmit the facsimile data, on the other hand, the multi-function device 3 transmit the facsimile transmission request to the communication box 2 through the child unit 4, so that the starting of the WLAN communication control portion 15 of the communication box 2 is ensured by the facsimile transmission request (which is eventually received as the facsimile transmission request signal by the communication box 2).

Accordingly, the communication box 2 and the multi-function device 3 can effectively reduce the electric energy consumption by the WLAN communication control portions 15, 35, making it possible to effective reduce the electric energy consumption by the communication system 1 as a whole.

In addition, the communication box 2 does not unconditionally start its WLAN communication control portion 15 when the communication box 2 has received the facsimile data from the public communication line 7. That is, the communication box 2 starts its WLAN communication control portion 15 only when the communication box 2 has received the notice of permission of facsimile reception from the child unit 4 in response to the facsimile reception request transmitted to the child unit 4, that is, only when the communication box 2 has confirmed the reception of the facsimile reception request by the multi-function device 3 through the child unit 4. Accordingly, the reduction of the electric energy consumption by the communication box 2 can be achieved effectively.

Like the communication box 2, the multi-function device 3 dos not unconditionally start its WLAN communication control portion 35 when the multi-function device 3 is commanded to transmit the facsimile data. That is, the multi-function device 3 starts its WLAN communication control portion 35 only when the multi-function device 3 has received the facsimile transmission permission signal from the child unit 4 in response to the facsimile transmission request signal transmitted to the child unit 4, that is, only when the multi-function device 3 has confirmed the reception of the facsimile transmission request by the communication box 2 through the child unit 4. Accordingly, the reduction of the electric energy consumption by the multi-function device 3 can be achieved effectively.

Further, the multi-function device 3 is provided with the charging stand 9 in which the child unit 4 is installed to permit the child unit 4 to be charged. While the child unit 4 is installed in this charging stand 9, the optical communication between the child unit 4 and the multi-function device 3 is possible. The user is necessarily encouraged to install the child unit in the charging stand 9 while the child unit 4 is not used for a telephone call.

Accordingly, it is possible to effectively avoid a risk of a failure to start the WLAN communication control portion 15, 35 of one of the communication box 2 and multi-function device 3 due to the child unit 4 not installed in the charging stand 9 when the other of the communication box 2 and multi-function device 3 is commanded to transmit the facsimile data, that is, a risk of a failure of the facsimile transmission and reception between the communication box 2 and multi-function device 3 due to the child unit 4 not installed in the charging stand 9 when the other device is commanded to transmit the facsimile data.

When the child unit 4 receives the facsimile transmission request signal from the multi-function device 3, the child unit 4 transmits the facsimile transmission request to the communication box 2, and transmits the facsimile reception confirmation signal to the multi-function device 3 in response to the facsimile transmission request signal. Depending upon whether the facsimile reception confirmation signal has been received from the child unit 4, the multi-function device 3 can determine whether the child unit 4 is installed in the charging stand 9, and whether the child unit 4 is enabled to transmit the facsimile transmission request to the communication box 2. In the absence of the facsimile reception confirmation signal, the multi-function device 3 provides the alarming indication or sound prompting the user to install the child unit 4 in the charging stand 9.

Accordingly, when the multi-function device 3 is commanded to transmit the facsimile data, the user is informed of the fact that the child unit 4 is not installed in the charging stand 9, so that the user timely installs the child unit 4 in the charging stand 9, to permit the facsimile transmission from the multi-function device 3.

Further, the signal transmission and reception by the optical communication between the child unit 4 and the multi-function device 3 are effected by light emission in different patterns corresponding to respective kinds of the signal to be transmitted and received, so that the receiver can receive the correct signal from the transmitter.

In the illustrated embodiment, it will be understood that the communication box 2 corresponds to a primary communication device and a first communication device, and the child unit 4 corresponds to a first auxiliary communication device, while the multi-function device 3 corresponds to a second auxiliary communication device and a second communication device. It will also be understand that the DCL communication mode corresponds to a first communication mode, and the WLAN communication mode corresponds to a second communication mode, while the optical communication mode corresponds to a third communication mode, and that the DCL communication control portion 21 provided in the communication box 2 corresponds to a first communicating portion, and the WLAN communication control portion 15 provided in the communication box 2 corresponds to a second communicating portion while the WLAN communication control portion 35 provided in the multi-function device 3 corresponds to a second auxiliary communicating portion and a communicating portion. It will further be understood that the WLAN start signal control portion 38 and the signal detecting portion 44 that are provided in the multi-function device 3 correspond to a fourth auxiliary communicating portion and a signal transmitting/receiving portion. It will also be understood that the WLAN start signal control portion 62 and the signal detecting portion 63 provided in each of the child units 4, 5, 6 correspond to a third auxiliary communicating portion and a signal transmitting/receiving portion, and that the DCL communication control portion 55 provided in each of the child units 4, 5, 6 corresponds to a first auxiliary communicating portion and a communicating portion.

Figure 6:
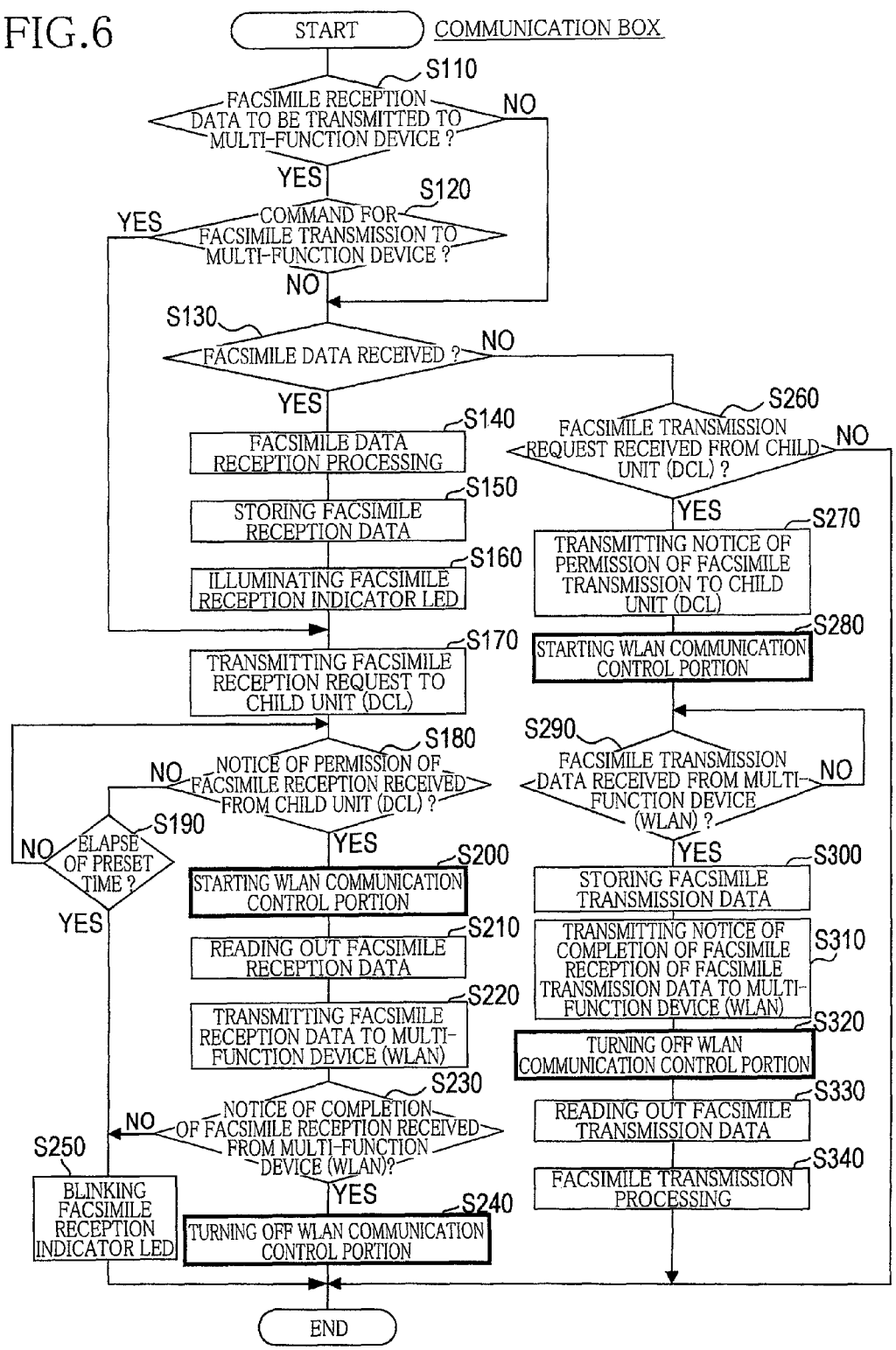
FIG. 6 is a flow chart illustrating a facsimile transmission/reception control routine executed by the communication box.

It will also be understood that a portion of the communication box 2 assigned to implement step S170 of the facsimile transmission/reception control routine illustrated in the flow chart of FIG. 6 corresponds to a primary start requesting portion and a start requesting portion, and a portion of the communication box 2 assigned to implement step S200 of the facsimile transmission/reception control routine corresponds to a primary first starting portion and a first starting portion. It will further be understood that a portion of the communication box 2 assigned to implement step S240 corresponds to a primary first stopping portion and a first stopping portion, and a portion of the communication box 2 assigned to implement step S270 corresponds to a primary reply data commanding portion. It will also be understood that a portion of the communication box 2 assigned to implement step S280 corresponds to a primary second starting portion and a second starting portion, and a portion of the communication box 2 assigned to implement step S320 corresponds to a primary second stopping portion and a second stopping portion.

Figure 7:
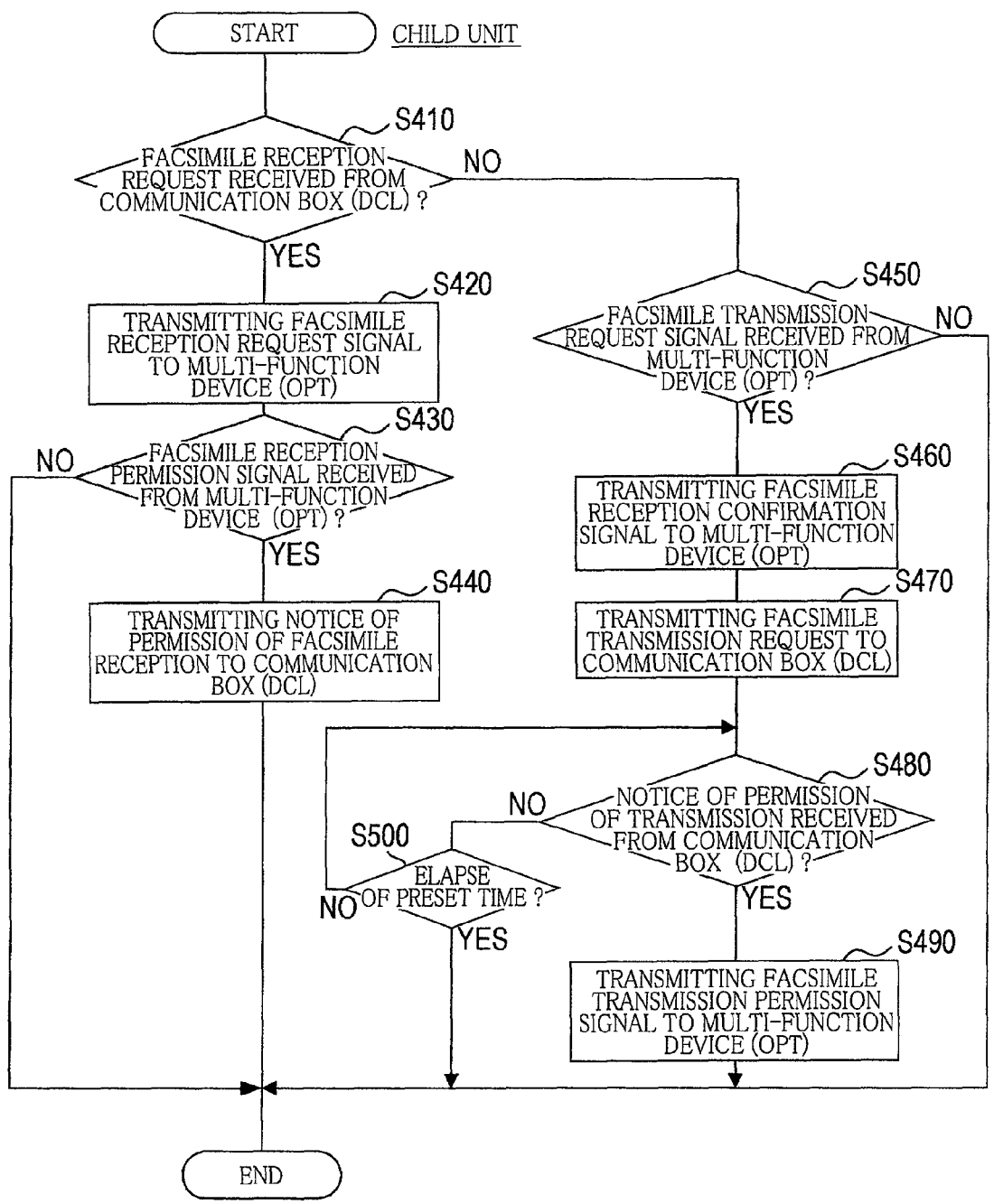
FIG. 7 is a flow chart illustrating a WLAN start control routine executed by the child unit.

It will further be understood that a portion of the child unit 4 assigned to implement step S420 of the WLAN start control routine illustrated in the flow chart of FIG. 7 corresponds to a start request signal commanding portion, and a portion of the child unit 4 assigned to implement step S440 of the WLAN start control routine corresponds to an auxiliary reply data commanding portion. It will also be understood that a portion of the child unit 4 assigned to implement step S470 corresponds to a start request data commanding portion, and a portion of the child unit 4 assigned to implement step S490 of the WLAN start control routine corresponds to an auxiliary reply signal commanding portion.

It will further be understood that a portion of the multi-function device 3 assigned to implement step S650 of the facsimile transmission/reception control routine illustrated in the flow chart of FIG. 8 corresponds to an auxiliary start requesting portion and a start requesting portion, and a portion of the multi-function device 3 assigned to implement step S710 of the facsimile transmission/reception control routine of FIG. 8 corresponds to an auxiliary first starting portion and a first starting portion. It will also be understood that a portion of the multi-function device 3 assigned to implement step S750 corresponds to an auxiliary first stopping portion and a first stopping portion, and a portion of the multi-function device 3 assigned to implement step S770 corresponds to an auxiliary reply signal commanding portion. It will further be understood that a portion of the multi-function device 3 assigned to implement step S780 corresponds to an auxiliary second starting portion and a second starting portion, and a portion of the multi-function device 3 assigned to implement step S820 corresponds to an auxiliary second stopping portion and a second stopping portion.

Modifications of Illustrated Preferred Embodiment

While the preferred embodiment of the present invention has been described for illustrated purpose only, it is to be understood that the invention is not limited to the details of the illustrated preferred embodiment, but may be otherwise embodied, without departing from the spirit and scope of the invention defined in the appended claims.

In the illustrated embodiment, the WLAN regulators 16, 36 are controlled to permit and inhibit the electric energy supply to the WLAN communication control portion 15 of the communication box 2 and the WLAN communication control portion 35 of the multi-function device 3, for starting and stopping (turning on and off) the WLAN communication control portions 15, 35. However, any other means may be employed to start and stop the WLAN communication control portions 15, 35. For example, a switching element may be provided in a path of electric power supply from the WLAN regulator and the corresponding WLAN communication control portion 15, 35, so that the WLAN communication control portion 15, 35 can be started and stopped by turning on and off the switching element.

The illustrated communication system 1 is configured to determine whether the child unit 4 is set in the multi-function device 3 or not upon entry of the facsimile transmission command by the user, by determining whether the facsimile reception confirmation signal has been received from the child unit 4. However, the determination as to whether the child unit 4 is set in the multi-function device 3 can be made on the basis of an output signal of the child unit detecting portion 48 provided in the multi-function device 3.

While the illustrated communication system 1 is configured to effect optical communication for signal transmission and reception between the child unit 4 and the multi-function device 3, the signal transmission and reception between the child unit 4 and the multi-function device 3 may be effected by any other suitable means.

For instance, the charging portions 47 and 66 may be used for the signal transmission and reception between the child unit 4 and the multi-function device 3. For instance, the frequency for generation and supply of an electric energy by the charging portion 47 of the multi-function device 3 is changed depending upon the kind of the signal to be transmitted to the child unit 4.

Where the signal is transmitted from the child unit 4 by using its charging portion 66, the electric current generated by the charging portion 66 is changed in a pattern which changes depending upon the kind of the signal to be transmitted to the multi-function device 3. The electric current to be supplied from the charging portion 47 of the multi-function device 3 changes with a change of the electric current generated by the child unit 4, so that the signal transmitted from the child unit 4 can be detected on the basis of the change of the electric current supplied from the multi-function device 3.

Various different methods are available for detecting the change of the electric current supplied by the charging portion 47 of the multi-function device 3. A voltage across the opposite ends of a coil of the charging portion 47 changes with a change of the supplied electric current, so that the change of the electric current can be detected on the basis of a change of the voltage. Alternatively, a detecting resistor is connected in series with the coil, so that the change of the electric current can be detected on the basis of a change of a voltage across the opposite ends of the detecting resistor.

Further alternatively, the signal transmission and reception between the child unit 4 and the multi-function device 3 is possible by direct transmission and reception of an electric signal through a signal line, rather than using the optical signal. For example, signal transmission and reception terminals are provided in both of the charging stand 9 of the multi-function device 3 and the child unit 4, so that the terminals of the charging stand 9 and the child unit 4 are brought into direct contact with each other when the child unit 4 is set in the charging stand 9, whereby the signal transmission and reception are effected through the electric contact of the terminals.

What is claimed is:

1. A communication system comprising: a primary communication device having a first communicating portion configured to effect wireless communication in a first communication mode, and a second communicating portion configured to effect wireless communication in a second communication mode different from the first communication mode; a first auxiliary communication device having a first auxiliary communicating portion configured to effect communication with the first communicating portion of the primary communication device in the first communication mode; and a second auxiliary communication device having a second auxiliary communicating portion configured to effect communication with the second communicating portion of the primary communication device in the second communication mode, wherein the first auxiliary communication device further has a third auxiliary communicating portion configured to effect the communication with the second auxiliary communication device in a third communication mode different from the first communication mode and the second communication mode, the second auxiliary communication device further having a fourth auxiliary communicating portion configured to effect the communication with the third auxiliary communicating portion in the third communication mode, at least one of the primary communication device and the second auxiliary communication device further having a first control portion configured such that when said one communication device is commanded to effect the communication with the other communication device in the second communication mode, the first control portion transmits to the other communication device a request to start the communicating portion of the other communication device, by communication between the primary communication device and the first auxiliary communication device in the first communication mode and communication between the first auxiliary communication device and the second auxiliary communication device in the third communication mode, starts the communicating portion of said one communication device to effect the communication in the second communication mode, and stops an operation of the communicating portion of said one communication device in the second communication mode after the communication with the other communication device in the second communication mode is terminated, and wherein said other communication device further has a second control portion configured such that when the other communication device receives the request to start its communicating portion from said one communication device, by the communication between the primary communication device and the first auxiliary communication device in the first communication mode and the communication between the first auxiliary communication device and the second auxiliary communication device in the third communication mode, the second control portion starts the communicating portion of the other communication device to effect the communication in the second communication mode, and stops an operation of the communicating portion of said other communication device in the second communication mode after the communication with said one communication device in the second communication mode is terminated.

2. The communication system according to claim 1, wherein the primary communication device includes as the first control portion:
a primary start requesting portion configured to command the first communicating portion to transmit the request to start the second auxiliary communicating portion of the second auxiliary communication device when the primary communication device is commanded to effect the communication with the second auxiliary communication device;
a primary first starting portion configured to start the second communicating portion when the primary communication device is commanded to effect the communication with the second auxiliary communication device; and
a primary first stopping portion configured to stop the operation of the second communicating portion when the communication of the second communicating portion with the second auxiliary communicating portion is terminated after the second communicating portion is started by the primary first starting portion,
the first auxiliary communicating device having a start request signal commanding device configured to command the third auxiliary communicating portion to transmit a start request signal indicative of the request to start the second auxiliary communicating portion when the first auxiliary communicating device has received from the primary communication device the request to start the second auxiliary communicating portion,
and wherein the second auxiliary communication device includes as the second control portion:
an auxiliary second starting portion configured to start the second auxiliary communicating portion when the fourth communicating portion has received the start request signal from the first auxiliary communicating device; and
an auxiliary second stopping portion configured to stop the operation of the second auxiliary communicating portion when the communication of the second auxiliary communicating portion with the second communicating portion is terminated after the second auxiliary communicating portion is started by the auxiliary second starting portion.

3. The communication system according to claim 2, wherein the second auxiliary communication device has an auxiliary reply signal commanding portion configured to command the fourth auxiliary communicating portion to transmit an auxiliary reply signal to the first auxiliary communication device when the fourth auxiliary communicating portion has received the start request signal from the first auxiliary communication device;
and wherein the first auxiliary communication device has an auxiliary reply data commanding portion configured to command the first auxiliary communicating portion to transmit auxiliary reply data to the primary communication device when the third communicating portion has received the auxiliary reply signal from the second auxiliary communication device,
the primary first starting portion of the primary communication device starts the second communicating portion when the first communicating portion has received the auxiliary reply data from the first auxiliary communicating portion.

4. The communication system according to claim 1, wherein the second auxiliary communicating device includes as the first control portion:
a second auxiliary start requesting portion configured to command the fourth auxiliary communicating portion to transmit the request to start the second communicating portion of the primary communication device when the second auxiliary communication device is commanded to effect the communication with the primary communication device;
an auxiliary first starting portion configured to start the second auxiliary communicating portion when the second auxiliary communication device is commanded to effect the communication with the primary communication device; and
an auxiliary first stopping portion configured to stop the operation of the second auxiliary communicating portion when the communication of the second auxiliary communicating portion with the second communicating portion is terminated after the second auxiliary communicating portion is started by the auxiliary first starting portion,
the first auxiliary communicating device having a start request data commanding portion configured to command the first auxiliary communicating portion to transmit start request data indicative of the request to start the second communicating portion when the third auxiliary communicating portion has received from the second auxiliary communication device the request to start the second communicating portion,
and wherein the primary communication device includes as the second control portion:
a primary second starting portion configured to start the second communicating portion when the first communicating portion has received the start request data from the first auxiliary communication device; and
a primary second stopping portion configured to stop the operation of the second communicating portion when the communication of the second communicating portion with the second auxiliary communicating portion is terminated after the second communicating portion is started by the primary second starting portion.

5. The communication system according to claim 4, wherein the primary communication device has a primary reply data commanding portion configured to command the first communicating portion to transmit primary reply data to the first auxiliary communicating device when the first communication portion has received the start request data from the first auxiliary communication device,
the first auxiliary communication device having an auxiliary reply signal commanding portion configured to command the third auxiliary communicating portion to transmit an auxiliary reply signal to the second auxiliary communication device when the first auxiliary communicating portion has received the primary reply data from the primary communication device,
and wherein the auxiliary first starting portion of the second auxiliary communication device starts the second auxiliary communicating portion when the fourth auxiliary communicating portion has received the auxiliary reply signal from the first auxiliary communicating portion.

6. The communication system according to claim 1, wherein the first auxiliary communication device includes:
a start request signal commanding portion configured to command the third auxiliary communicating portion to transmit a start request signal indicative of the request to start the second auxiliary communicating portion when the first auxiliary communicating portion has received from the primary communication device the request to start the second auxiliary communicating portion; and a start request data commanding portion configured to command the first auxiliary communicating portion to transmit start request data indicative of the request to start the second communicating portion when the third auxiliary communicating portion has received from the second auxiliary communication device the request to start the second communicating portion, and wherein the primary communication device includes as the first control portion:

a primary start requesting portion configured to command the first communicating portion to transmit the request to start the second auxiliary communicating portion of the second auxiliary communication device when the primary communication device is commanded to effect the communication with the second auxiliary communication device;

a primary first starting portion configured to start the second communicating portion when the primary communication device is commanded to effect the communication with the second auxiliary communication device;

a primary first stopping portion configured to stop the operation of the second communicating portion when the communication of the second communicating portion with the second auxiliary communicating portion is terminated after the second communicating portion is started by the primary first starting portion;

a primary second starting portion configured to start the second communicating portion when the first communicating portion has received the start request data from the first auxiliary communicating portion; and a primary second stopping portion configured to stop the operation of the second communicating portion when the communication of the second communicating portion with the second auxiliary communicating portion is terminated after the second communicating portion is started by the primary second starting portion, and wherein the second auxiliary communication device includes as the second control portion:

an auxiliary start requesting portion configured to command the fourth communicating portion to transmit the request to start the second communicating portion when the second auxiliary communication device is commanded to effect the communication with the primary communication device;

an auxiliary first starting portion configured to start the second auxiliary communicating portion when the second auxiliary communication device is commanded to effect the communication with the primary communication device;

an auxiliary first stopping portion configured to stop the operation of the second auxiliary communicating portion when the communication of the second auxiliary communicating portion with the second communicating portion is terminated after the second auxiliary communicating portion is started by the auxiliary first starting portion;

an auxiliary second starting portion configured to start the second auxiliary communicating portion when the fourth communicating portion has received the start request signal from the first auxiliary communicating device; and an auxiliary second stopping portion configured to stop the operation of the second auxiliary communicating portion when the communication of the second auxiliary communicating portion with the second communicating portion is terminated after the second auxiliary communicating portion is started by the auxiliary second starting portion.

7. The communication system according to claim 6, wherein the second auxiliary communication device has an auxiliary reply signal commanding portion configured to command the fourth auxiliary communicating portion to transmit an auxiliary reply signal to the first auxiliary communication device when the fourth auxiliary communicating portion has received the start request signal from the first auxiliary communication device;

and wherein the first auxiliary communication device has an auxiliary reply data commanding portion configured to command the first auxiliary communicating portion to transmit auxiliary reply data to the primary communication device when the third communicating portion has received the auxiliary reply signal from the second auxiliary communication device, the primary first starting portion of the primary communication device starts the second communicating portion when the first communicating portion has received the auxiliary reply data from the first auxiliary communicating portion.

8. The communication system according to claim 6, wherein the primary communication device has a primary reply data commanding portion configured to command the first communicating portion to transmit primary reply data to the first auxiliary communicating device when the first communication portion has received the start request data from the first auxiliary communication device, the first auxiliary communication device having an auxiliary reply signal commanding portion configured to command the third auxiliary communicating portion to transmit an auxiliary reply signal to the second auxiliary communication device when the first auxiliary communicating portion has received the primary reply data from the primary communication device, and wherein the auxiliary first starting portion of the second auxiliary communication device starts the second auxiliary communicating portion when the fourth auxiliary communicating portion has received the auxiliary reply signal from the first auxiliary communicating device.

9. The communication system according to claim 1, wherein the second auxiliary communication device has a first-auxiliary-communication-device installing portion in which the first auxiliary communication device is installed, and the first auxiliary communication device permits the communication with the second auxiliary communication device in the third communication mode while the first auxiliary communication device is installed in the first-auxiliary-communication-device installing portion.

10. The communication system according to claim 9, wherein the third auxiliary communicating portion has a first auxiliary light emitting portion and a first auxiliary light receiving portion that are provided in the first auxiliary communication device, and the fourth auxiliary communicating portion has a second auxiliary light receiving portion and a second auxiliary light emitting portion that are respectively opposed to the first auxiliary light emitting portion and the first auxiliary light receiving portion while the first auxiliary communication device is installed in the first-auxiliary-communication-device installing portion.

11. The communication system according to claim 9, wherein the second auxiliary communication device has:

a first-auxiliary-communication-device detecting portion configured to detect the first auxiliary communication device installed in the first-auxiliary-communication-device installing portion; and an indicating portion configured to indicate that the first auxiliary communication device installed in the first-auxiliary-communication-device installing portion is not detected by the first-auxiliary-communication-device detecting portion when the second communication device is commanded to effect the communication with the primary communication device.

12. The communication system according to claim 1, wherein the primary communication device has:

a communication-line connecting portion connected to a public communication line and configured to transmit and receive a sound signal and facsimile data through the public communication line; and a sound transmission/reception control portion configured to effect transmission and reception of sound data indicative of the sound signal to and from the first auxiliary communication device through the first communicating portion, and wherein the primary communication device is commanded to effect the communication with the second auxiliary communicating device when the communication-line connecting portion has received the facsimile data, and the second communicating portion is configured to transmit the received facsimile data to the second auxiliary communication device, the second auxiliary communication device having a facsimile data accepting portion configured to accept facsimile data to be transmitted to an external device through the communication-line connecting portion, and wherein the second auxiliary communication device is commanded to effect the communication with the primary communication device when the facsimile data accepting portion has accepted the facsimile data, and the second auxiliary communicating portion is configured to transmit the accepted facsimile data to the primary communication device.

13. The communication system according to claim 12, wherein the second auxiliary communication device has a data storing portion which receives the facsimile data from the primary communication device through the second auxiliary communicating portion and which is capable of storing the received facsimile data in a memory medium.

14. The communication system according to claim 12, wherein the second auxiliary communication device has a data storing portion for storing the facsimile data which have been accepted by the facsimile data accepting portion and which are transmitted to the primary communication device through the second auxiliary communicating portion.

* * * * *